US005334482A

United States Patent [19]

Aono

[11] Patent Number: 5,334,482

[45] Date of Patent: Aug. 2, 1994

[54] PHOTOGRAPHIC ELEMENT WITH GAS PERMEABLE HYDROPHOBIC LAYER ON BACKING LAYER

[75] Inventor: Toshiaki Aono, Kanagawa, Japan

[73] Assignee: Fuji Photo Film Co., Ltd., Kanagawa, Japan

[21] Appl. No.: 871,029

[22] Filed: Apr. 20, 1992

[30] Foreign Application Priority Data

Apr. 19, 1991 [JP] Japan .................................. 3-115574

[51] Int. Cl.[5] .......................... G03C 5/34; G03C 1/88; B32B 3/26

[52] U.S. Cl. .................................... 430/203; 430/212; 430/213; 430/215; 430/539; 430/523; 430/531; 430/930; 428/364.4; 428/317.1; 428/317.9; 428/318.4; 428/478.2

[58] Field of Search ............... 430/203, 212, 213, 215, 430/539, 930, 523, 531; 428/478.4, 304.4, 317.1, 318.4, 478.2, 317.9, 423.1, 423.5, 500, 476.6, 532

[56] References Cited

U.S. PATENT DOCUMENTS

| | | | |
|---|---|---|---|
| 1,939,171 | 12/1933 | Hickman | 430/539 |
| 2,953,366 | 12/1960 | Kosar et al. | 430/930 |
| 3,752,692 | 8/1973 | Young | 430/215 |
| 4,868,088 | 9/1989 | Aono et al. | 430/215 |
| 5,156,939 | 10/1992 | Koide | 430/203 |

FOREIGN PATENT DOCUMENTS

| | | | |
|---|---|---|---|
| 3274954 | 11/1988 | Japan | 430/930 |

*Primary Examiner*—Richard L. Schilling
*Attorney, Agent, or Firm*—Sughrue, Mion, Zinn, Macpeak & Seas

[57] ABSTRACT

A photographic element is described comprising a layer containing a hydrophilic low molecular weight compound on one surface of a support and a backing layer comprising a hydrophilic binder on the other surface of the support, wherein a gas-permeable hydrophilic layer is provided as the outermost layer of said backing layer. In addition, a dye-fixing element is described to which is transferred a mobile dye to be formed or released by heat-development of a photographic element, wherein said photographic element comprises a light-sensitive silver halide, a hydrophilic binder and a dye providing compound for forming or releasing a mobile dye in correspondence or reverse correspondence with the amount of exposure, after or simultaneously with, imagewise exposure of said photographic element in the presence of at least one of a base and a base precursor, wherein said dye-fixing element comprises a base or base precursor in a dye-fixing layer or an adjacent layer(s) on one surface of a support, and has a backing layer comprising a hydrophilic binder on the other surface of said support and comprising as the outermost layer a gas-permeable hydrophilic layer.

8 Claims, No Drawings

PHOTOGRAPHIC ELEMENT WITH GAS PERMEABLE HYDROPHOBIC LAYER ON BACKING LAYER

FIELD OF THE INVENTION

The present invention relates to a photographic element having an excellent storage stability in the form of a plurality of elements. In particular, it relates to a dye-fixing element to be used in a method of forming an image by heat-development, the element having an excellent storage stability in storage in the form of a plurality of elements.

BACKGROUND OF THE INVENTION

Since a photographic method using a silver halide is superior to any other photographic methods such as an electro-photographic method or a diazo-photographic method in regard to photographic characteristics such as sensitivity and gradation adjustment, it has heretofore been utilized most widely in the technical field.

Recently, a technology of simply and rapidly obtaining a photographic image has been developed, by exchanging the conventional wet processing treatment (using a developer or the like in the method for forming a photographic image in a silver halide-containing photographic material) for a dry processing treatment by heating or the like.

As a means of obtaining a color image by heat-development, various methods have been proposed. For instance, a method of forming a color image by coupling of an oxidation product of a developing agent and a coupler has been described in U.S. Pat. Nos. 3,531,286, 3,761,270, and 4,021,240, Belgian Patent 802,519, and *Research Disclosure*, pages 31 and 32 (September, 1975).

However, the proposed method has a drawback in that the color image to be formed is often turbid since an image of reduced silver and a color image are simultaneously formed in the exposed and heat-developed area.

In order to overcome the drawback, various methods have been proposed, such as: a method of imagewise forming or releasing a mobile (diffusive) dye by heating, followed by transferring the mobile dye to a dye-fixing element having a mordant with a solvent such as water; a method of transferring the mobile dye to a dye-fixing element with a high boiling point organic solvent; a method of transferring the mobile dye to a dye-fixing element with a hydrophilic heat solvent as incorporated into the element; and a method of transferring the mobile dye, which is a heat-diffusive or sublimable dye, to a dye-receiving element such as a support. Refer to U.S. Pat. Nos. 4,463,079, 4,474,867, 4,478,927, 4,507,380, 4,500,626 and 4,483,914; and JP-A-58-149046, JP-A-58-149047, JP-A-59-152440, JP-A-59-154445, JP-A-59-165054, JP-A-59-180548, JP-A-59-168439, JP-A-59-174832, JP-A-59-174833, JP-A-59-174834 and JP-A-59-174835 (the term "JP-A" as used herein means an "unexamined published Japanese patent application")

Where a hydrophilic binder is used in the dye-fixing layer of the dye-fixing element of such image forming methods, the element often curls to the dye-fixing layer under low humidity conditions. Therefore, in general, a backing layer consisting essentially of a hydrophilic binder is provided on the back surface of the element so as to attain curling balance in the element.

However, use of such a backing layer causes many problems. Namely, where plural dye-fixing elements, each having a hydrophilic low molecular compound, such as a base or a base precursor in the dye-fixing layer, are piled up under high humidity conditions, the base or base precursor would migrate to the adjacent backing layer so that the distribution of the base or base precursor in the dye-fixing layer would become uneven. As a result, the color density of the developed and transferred image to be formed on the element would be uneven.

SUMMARY OF THE INVENTION

The object of the present invention is to provide a dye-fixing element which contains a hydrophilic low molecular compound, such as a base or a base precursor, in the dye-fixing layer or the adjacent layer and which has a backing layer for the purpose of attaining good curling balance. When a plurality of such dye-fixing elements are piled up and stored under a high humidity condition, the base or base precursor in one element does not migrate to the backing layer of the adjacent element so that the elements, and the images to be formed, are free from unevenness.

The above-mentioned object and other objects are attained by the present invention mentioned below.

Specifically, there is provided in accordance with the present invention a photographic element comprising a layer containing a hydrophilic low molecular weight compound on one surface of a support, and a backing layer comprising a hydrophilic binder on the other surface of the support, wherein a gas-permeable hydrophobic layer is provided as the outermost layer of the backing layer.

There is also provided in accordance with the present invention a dye-fixing element to which is transferred a mobile dye to be formed or released by heat-development of a photographic element, wherein said photographic element comprises a light-sensitive silver halide, a hydrophilic binder and a dye providing compound for forming or releasing a mobile dye in correspondence or reverse correspondence with the amount of exposure, after or simultaneously with, imagewise exposure of said photographic element in the presence of at least one of a base and a base precursor, wherein said dye-fixing element comprises a base or base precursor in at least a dye-fixing layer or an adjacent layer(s) on one surface of a support, and has a backing layer comprising a hydrophilic binder on the other surface of said support and comprising as the outermost layer a gas-permeable hydrophobic layer.

The present invention is especially useful to a dye-fixing element containing a base or base precursor in the dye-fixing layer or the adjacent layer and having a backing layer comprising a hydrophilic binder, but it is not limited to only this. The dye-fixing element may be applied to any other photographic element containing a hydrophilic low molecular weight compound.

DETAILED DESCRIPTION OF THE INVENTION

The present invention will be explained in greater detail below.

As examples of the gas-permeable hydrophobic layer to be employed in the present invention, the following three types are mentioned.

(1) The first type of the gas-permeable hydrophobic layer to be employed in the present invention is an aeriferous porous layer containing a hydrophobic polymer.

(2) The second type of the gas-permeable hydrophobic layer to be employed in the present invention is an aeriferous hydrophobic layer comprising organic or inorganic fine grains and a hydrophobic polymer as an adhesive for said fine grains.

(3) The third type of the gas-permeable hydrophobic layer to be employed in the present invention is a non-porous layer made of a steam-permeable hydrophobic polymer.

The terminology "gas-permeable", as used herein, indicates that the film may easily permeate a gaseous substance; and the terminology "aeriferous" indicates that the front surface and the back surface of the film are connected with each other via an aerial phase.

A hydrophobic polymer-containing aeriferous porous layer of the first type will first be mentioned below.

There are means of forming a hydrophobic polymer-containing porous layer of the present invention on the backing layer (which comprises a hydrophilic binder) of a dye-fixing element, such as: (1) a method of coating a bubbled liquid to be prepared by mechanically stirring an emulsion of a synthetic resin such as polyurethane, or a latex of a synthetic rubber such as methyl methacrylatebutadiene rubber, on the surface of a backing layer of a dye-fixing element, followed by drying the coated liquid to form a porous layer thereon; (2) a method of coating a mixed liquid to be prepared by incorporating a foaming agent to the above-mentioned synthetic resin emulsion or synthetic rubber latex on the surface of a backing layer of a dye-fixing element, followed by drying the coated liquid to form a porous layer thereon; (3) a method of heating and foaming, on the surface of a backing layer of a dye-fixing element, a liquid mixture to be prepared by incorporating a foaming agent into a synthetic resin, such as vinyl chloride plastisol or polyurethane, or a synthetic rubber, such as styrene-butadiene rubber (JP-A-1-145192); (4) a method of preparing a W/O type emulsion comprising a thermoplastic resin, an organic solvent having a limited water-solubility and water, followed by coating and drying it on the surface of a backing layer of a dye-fixing element; (5) a method of forming a thin porous film by stretching a film made of a thermoplastic resin containing an inorganic filler, followed by laminating it on the surface of a backing layer of dye-fixing element with an adhesive; and (6) a method of forming a porous layer by utilizing phase separation of a hydrophobic polymer.

Preferred is the method (6) of utilizing phase separation of a hydrophobic polymer, for forming an aeriferous porous layer to be used in the present invention. It is especially preferable if cellulose acetate is used as the hydrophobic polymer in method (6). Precisely, cellulose acetate is dissolved in a good solvent and a bad solvent and/or a non-solvent for cellulose acetate are/is added thereto, and the resulting solution is coated and dried on the surface of a backing layer to form an intended porous layer thereon.

Cellulose acetate to be used in the method may be prepared by any conventional technique. Above all, one having a mean acetylation degree from 55 to 62 is especially advantageous.

The acetylation degree as referred to herein is represented by the following formula:

Acetylation Degree = [(weight of acetic acid

-continued to be obtained by saponifying cellulose acetate) ÷ (weight of cellulose acetate)] × 100

For forming a porous layer containing cellulose acetate, cellulose acetate is dissolved in a good solvent and a bad solvent and/or a non-solvent for cellulose acetate are/is added thereto, and the resulting mixed solution may be coated and dried on the surface of a backing layer of a dye-fixing element.

It is preferred that the mixed solution is coated and dried under a controlled temperature-humidity condition.

After a solution containing cellulose acetate has been coated on the surface of the backing layer, the coated surface is kept at a temperature of not higher than the boiling point of the used good solvent, preferably at a temperature that easily causes phase separation of cellulose acetate (35° C. or lower) so as to form fine pores in the formed layer; and, thereafter, the layer is heated and dried at 50° C. to 120° C.

Suitably, the amount of the good solvent to be used is from 30 to 200 parts to 10 parts of the polymer; that of the non-solvent is from 6 to 40 parts by weight to 10 parts of the plymer; and that of the bad solvent is from 0 to 140 parts to 10 parts of the polymer.

The good solvent as referred to herein means a solvent capable of well dissolving cellulose acetate (i.e., dissolving 1% by weight or more, and preferably 5% by weight or more of cellulose acetate); which includes, for example, halogenated hydrocarbons such as methylene chloride and chloroform, esters such as methyl acetate and methylglycol acetate, and ketones such as acetone and methyl ethyl ketone.

The bad solvent as referred to herein means a solvent which merely swells cellulose acetate but does not substantially dissolve the same, may be miscible with the above-mentioned good solvent, and has a higher boiling point than the good solvent. Specific examples of such a bad solvent usable in the present invention include alcohols such as methanol, ethanol and butanol, and ethers such as isopropyl ether. Especially preferred is methanol.

The non-solvent as referred to herein means a solvent which neither dissolves nor swells cellulose acetate, is miscible with the above-mentioned good solvent or bad solvent, and has a higher solvent than the good solvent. Specific examples of such a non-solvent usable in the present invention include hydrocarbons such as heptane and dodecane, polyhydric alcohols and ethers of polyalcohols such as ethylene glycol and ethylene glycol monoethyl ether, and water. Especially preferred is water.

Since the porous layer according to the present invention is formed by mixing cellulose acetate with a good solvent and a bad solvent (non-solvent), coating and then drying the resulting mix, it may easily be formed at a relatively low temperature.

The porosity of the layer may easily be adjusted by suitably adjusting and determining the kinds and amounts of the solvents to be used and the temperature-humidity condition in drying.

In general, in the case of forming a porous layer by phase separation, where the proportion of a non-solvent and/or a bad solvent is large, phase separation is accelerated so that the porosity of the porous layer to be formed is augmented. In this case, however, since use of too much non-solvent and/or bad solvent would interfere with dissolution of the resin used for forming the porous layer, the proportion of the solvents is thereby limited so that it is difficult to obtain a sufficient porosity. However, since the system of using cellulose acetate of the present invention has a characteristic of absorbing water, which is a bad solvent, during the step of coating and drying it, formation of a porous layer having a large porosity is possible. In addition, by well controlling the humidity and temperature in the coating and drying steps, the porosity of the layer may suitably be adjusted.

In accordance with the present invention, the porosity of the porous layer may be determined relatively freely, and the preferred porosity is, for example, from 10 to 90%, more desirably from 20 to 60%.

The porosity is advantageously larger in view of the humidity responsibility thereof (steam permeation speed through the layer), but if the porosity is too large, the porous layer would disadvantageously be brittle and weak.

By incorporating an organic or inorganic filler, a polyhydric alcohol and/or a crosslinking agent may be added to the solution of cellulose acetate and dissolved in the above-mentioned solvents. Further, the film strength of the porous layer as well as the adhesiveness between the layer and support may be improved.

As examples of an inorganic filler usable in the present invention, there are mentioned fine grains of silica, clay, talc, diatomaceous earth, calcium carbonate, calcium sulfate, barium sulfate, aluminium silicate, synthetic zeolite, zinc oxide, lithopone, titanium oxide, alumina or the like. The grains are desired to have a small grain size, generally to have a mean grain size which is preferably 1.0 μm or less, more preferably 0.5 μm or less, and even more preferably 0.2 μm or less. Colloidal silica is especially preferred.

As examples of an organic filler usable in the present invention, there are compounds described in JP-A-61-88252 (page 29) such as polyolefins and polymethacrylates, as well as compounds described in JP-A-63-274944 and JP-A-63-274952, such as benzoguanamine resin beads, polycarbonate resin beads, polystyrene resin beads and AS resin beads.

The grain size of the fine grains of an organic or inorganic filler to be used in the aeriferous hydrophobic layer of the first type of the present invention is generally preferably 1 μm or less, especially preferably 0.2 μm or less.

As polyhydric alcohols usable in the present invention, there are mentioned, for example, ethylene glycol, diethylene glycol, triethylene glycol, propylene glycol, dipropylene glycol, butanediol, neopentyl glycol, glycerin and pentaerythritol. Above all, those having a molecular weight of 1000 or less are preferred. Especially preferred are ethylene glycol and propylene glycol.

As a crosslinking agent for use in the present invention, any compound having two or more groups capable of reacting with OH group may be used. Preferred are isocyanate or epoxy crosslinking agents. Polyisocyanates are especially preferred, which include, for example, diisocyanates, such as diphenylmethane diisocyanate and toluene diisocyanate; triisocyanates, such as triphenylmethane triisocyanate; and other commercial products of polyisocyanates.

The porous layer of the present invention may contain, as a plasticizer in addition to the above-mentioned polyhydric alcohols, phthalates (e.g., dibutyl phthalate, diphenyl phthalate, dicyclohexyl phthalate), phosphates (e.g., triphenyl phosphate, tricresyl phosphate), and oil-soluble polymers or oligomers having a low glass transition (Tg) point.

In addition, other various additives may be added, if desired, to the mixture of cellulose acetate and the above-mentioned solvents. For instance, anionic surfactants such as higher carboxylate salts, higher alcohol sulfate ester salts, polyethylene glycol sulfate ester salts, alkylarylsulfonate salts and phosphate ester salts; cationic surfactants such as amine salts and quaternary ammonium salts; amphoteric surfactants such as dodecylaminoethylglycine sulfate salts; and nonionic surfactants such as alkyl ethers, alkylaryl ethers, sorbitan monoalkyl esters, polyoxyethylene alkylamines, polyoxyethylene alkylamides, polyethylene imines, polyoxyethylene, polyoxypropylene, glycol esters, saccharose esters, fatty acid ethanolamides, methylol amides and glucosides. Preferred surfactants include nonionic surfactants of the type that are added to food, such as stearic acid monoglyceride, polyoxyethylene sorbitan monostearate, polyoxyethylene octylphenol ether, and propylene glycol monooleate. Further, additional additives such as foaming aids (e.g., calcium chloride, sodium chloride, magnesium chloride and sodium sulfate); pore size adjusting agents (e.g., starch); and cellulose ether. Specific examples of such additives are described in JP-B-46-40426 and 48-40050. 40050. (The term "JP-B", as used herein, means an "examined Japanese patent publication".)

The amount of the organic or inorganic filler to be used in the present invention is generally from 1 to 60% by weight, preferably from 5 to 50% by weight, with respect to cellulose acetate.

The amount of the plasticizer (including polyhydric alcohols) to be used in the present invention is generally from 1 to 60% by weight, and preferably from 3 to 30% by weight, with respect to cellulose acetate.

The amount of the crosslinking agent to be used in the present invention is generally from 1 to 30% by weight, preferably from 5 to 20% by weight, with respect to cellulose acetate.

Next, the hydrophobic layer of the second type is discussed below.

The gas-permeable hydrophobic layer of the second type to be used in the present invention is an aeriferous hydrophobic layer comprising organic or inorganic fine grains and a hydrophobic polymer as an adhesive for the fine grains.

As a means of forming the hydrophobic layer of the second type, there is mentioned a method of dispersing organic or inorganic fine grains in an organic solvent solution or a latex of a hydrophobic polymer, followed by coating the resulting dispersion on the surface of a backing layer.

In accordance with the method, the hydrophobic polymer acts as an adhesive for the organic or inorganic fine grains, whereupon it does not completely fill the space between the fine grains. Accordingly, the hydrophobic layer to be formed by the method has aeriferous pores between the fine grains.

As the above-mentioned organic or inorganic fine grains, the same organic or inorganic filler as that used in the above-mentioned first type can be used.

The grain size of the said organic or inorganic fine grains is generally 50 μm or less, preferably from 0.1 to 30 μm, more preferably from 0.2 to 20 μm.

As the hydrophobic polymer for the second type, one having a glass transition point of 25° C. or lower is especially preferred.

The hydrophobic polymer may be combined with a plasticizer, whereupon it may be one having a glass transition point higher than 25° C.

The hydrophobic polymer may be used in the form of a solution whereby it is dissolved in an organic solvent; or preferably, it may be dissolved in a water-immiscible organic solvent and then forcedly emulsified in water; or it may also be used as a latex.

The amount of the hydrophobic polymer to be used is preferably from 1 to 100 parts by weight, especially preferably from 5 to 50 parts by weight, to 100 parts by weight of the above-mentioned organic or inorganic fine grains.

As usable examples of the above-mentioned hydrophobic polymer, there are mentioned acrylate or methacrylate polymers, styrene-butadiene polymers, polybutadienes, acrylonitrile-butadiene polymers, methyl methacrylate-butadiene polymers, 2-vinylpyridine-styrene-butadiene copolymers, polyurethanes, polyvinyl acetates, vinyl acetate-acrylate copolymers, vinyl acetate-VeoVa copolymers, vinyl acetate-ethylene copolymers, acrylatestyrene polymers, polyethylenes, vinyl chloride polymers, vinylidene chloride polymers, polyesters, polycarbonates, and polyamides.

As examples of monomers (for polymerization to the hydrophobic polymers) for use in the present invention, there are mentioned acrylates, methacrylates, crotonates, vinyl esters, maleic acid diesters, fumaric acid diesters, itaconic acid diesters, acrylamides, methacrylamides, vinyl ethers, styrenes, dicarboxylic acids, and glycols.

Specific examples of such monomers are mentioned below. Acrylates include, for example, methyl acrylate, ethyl acrylate, n-propyl acrylate, isopropyl acrylate, n-butyl acrylate, isobutyl acrylate, tert-butyl acrylate, hexyl acrylate, 2-ethylhexyl acrylate, acetoxyethyl acrylate, phenyl acrylate, 2-methoxy acrylate, 2-ethoxy acrylate, and 2-(2-methoxyethoxy)ethyl acrylate.

Methacrylates include, for example, methyl methacrylate, ethyl methacrylate, n-propyl methacrylate, tert-butyl methacrylate, cyclohexyl methacrylate, 2-hydroxyethyl methacrylate, and 2-ethoxyethyl methacrylate.

Crotonates include, for example, butyl crotonate, and hexyl crotonate.

Vinyl esters include, for example, vinyl acetate, vinyl propionate, vinyl butyrate, vinylmethoxy acetate, and vinyl benzoate.

Maleic acid diesters include, for example, diethyl maleate, dimethyl maleate, and dibutyl maleate.

Fumaric acid diesters include, for example, diethyl fumarate, dimethyl fumarate, and dibutyl fumarate.

Itaconic acid diesters include, for example, diethyl itaconate, dimethyl itaconate, and dibutyl itaconate.

Acrylamides include, for example, acrylamide, methylacrylamide, ethylacrylamide, propylacrylamide, n-butylacrylamide, tert-butylacrylamide, cyclohexylacrylamdie, 2-methoxyethylacrylamide, dimethylacrylamide, diethylacrylamide, and phenylacrylamide.

Methacrylamides include, for example, methylmethacrylamide, ethylmethacrylamide, n-butylmethacrylamide, tert-butylmethacrylamide, 2-methoxymethacrylamide, dimethylmethacrylamide, and diethylmethacrylamide.

Vinyl ethers include, for example, methyl vinyl ether, butyl vinyl ether, hexyl vinyl ether, methoxyethyl vinyl ether, and dimethylaminoethyl vinyl ether.

Styrenes include, for example, styrene, methylstyrene, dimethylstyrene, trimethylstyrene, ethylstyrene, isopropylstyrene, butylstyrene, chloromethylstyrene, methoxystyrene, butoxystyrene, acetoxystyrene, chlorostyrene, dichlorostyrene, bromostyrene, methyl vinylbenzoate, and 2-methylstyrene.

Dicarboxylic acids include, for example, terephthalic acid, isophthalic acid, succinic acid, sebacic acid, and adipic acid.

Glycols include, for example, ethylene glycol, diethylene glycol, triethylene glycol, propylene glycol, neopentyl glycol, and bisphenol A-ethylene oxide adduct.

The hydrophobic polymer to be composed of such monomers are preferably polymers of acrylates, copolymers of acrylates and methacrylates, copolymers of acrylates and acrylic acid or methacrylic acid, homopolymers or copolymers of vinyl acetate, styrene-butadiene copolymers, and polyurethanes.

Free radical polymerization of ethylenic unsaturated solid monomers is initiated by pyrolysis of a chemical initiator, by action of a reducing agent via a redox initiator, or by physical action such as irradiation of ultraviolet rays or other high energy radiations of application of high frequency waves.

Typical chemical initiators are water-soluble compounds such as persulfates (e.g., ammonium or potassium persulfate), hydrogen peroxide and 4,4'-azobis(4-cyanovalerianic acid), and water-insoluble compounds such as azoisobutyronitrile, benzoyl peroxide, and chlorobenzoyl peroxide.

Ordinary redox initiators include hydrogen peroxide-iron(II) salts, potassium persulfate-potassium bisulfite, and cerium salts of alcohols.

Examples of initiators as well as functions of them are described in F. A. Bovey, *Emulsion Polymerization*, (published by Interscience Publishes Inc., New York, 1955), pages 59 to 93.

As emulsifiers, preferred are surface-active compounds. Especially preferred are soap, sulfonates, sulfates, cationic compounds, amphoteric compounds, and high molecular weight protective colloids. Examples of these compounds and functions of them are described in *Belgische Chemische Industrie*, Vol. 28, pages 16 to 20 (1963).

The hydrophobic layer of the third type, to be used in the present invention, is a non-porous layer made of a steam-permeable hydrophobic polymer.

As the steam-permeable hydrophobic polymer to be used in the third type of the present invention, the hydrophobic polymer used in the previous second type may be referred to. Especially preferably, acrylate and/or methacrylate polymers and copolymers as well as styrene-butadiene copolymers and polyurethanes are used.

The hydrophobic polymer may be used in the form of a solution thereof as dissolved in an organic solvent. From the viewpoint of manufacture, it is preferably dissolved in a water-immiscible organic solvent and is forcedly emulsified in water to form an emulsion. Or the hydrophobic polymer may be used as a latex.

Where the polymer is used in the form of an aqueous dispersion such as a latex, it is desired that the polymer have a glass transition point of 25° C. or lower. This is because the latex grains are preferably fused together in the coating and drying steps at a temperature possibly nearest to room temperature.

The thickness of the thin hydrophobic layer to be formed by this method is generally from 0.1 to 10 μm, preferably from 0.2 to 5 μm, especially preferably from 0.2 to 2 μm.

To the thin hydrophobic layer to be formed by this method, a small amount of organic or inorganic fine grains, such as those used in the previous second method, may be added for the purpose of improving the antistatic property and the running property of the element.

Where the gas-permeable hydrophobic layer is formed from an aqueous dispersion of a hydrophobic polymer, it may be coated over a previously formed backing layer of a hydrophilic binder. More preferably, the layer is simultaneously formed with the backing layer by multi-coating due to the ease at which the two layers are formed.

The dye-fixing element of the present invention displays a higher effect when the base or base precursor to be used in the element is a water-soluble one. Specifically, a water-soluble base or base precursor to be used in the dye-fixing layer or the adjacent layer of the element absorbs moisture under a high humidity condition and, as a result, it would easily migrate to the hydrophilic gelatin layer of the backing layer of the adjacent element when plural elements are piled up and stored. In such a case, migration of the base or base precursor to the backing layer may be inhibited by coating a thin hydrophobic layer over the backing layer. In addition, since the hydrophobic layer of the present invention is gas-permeable, it does not interfere with the functions of the backing layer; namely, as a curling balance layer, and absorbing and desorbing moisture in accordance with the fluctuation of the ambient humidity condition.

The gas-permeable hydrophobic layer of the first and second type of the present invention has open-cellular pores therein so that the steam-permeating speed therethrough is extremely high. As a result, the moisture-absorbing and desorbing behavior of the hydrophobic layer-coated dye-fixing element of the present invention is not so different from that of the non-coated one. With respect to the third type of the invention, the coated layer is a thin film having a relatively high steam permeability, though it is a uniform film. Therefore, absorption and desorption of moisture through the film-coated element occur immediately to attain the intended curling balance between the front surface and the back surface of the element within 2 or 3 minutes.

Since the gas-permeable hydrophobic layer of the third type of the present invention is generally transparent, it may be applied to a dye-fixing element for OHP (overhead projector), displaying an excellent effect.

The mordant to be used in the dye-fixing layer of the dye-fixing element of the present invention is not specifically defined but any and every polymer mordant known in this technical field can be used. Preferably, polymers containing vinyl monomer units each having a tertiary amino group or quaternary ammonio group, as represented by anyone of the following formulae (I) to (IV), are used.

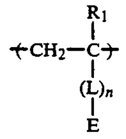

(I)

where $R_1$ represents a hydrogen atom, or a lower alkyl group having from 1 to 6 carbon atoms;

L represents a divalent linking group having from 1 to 20 carbon atoms;

E represents a heterocyclic group having a nitrogen atom with a double bond to a carbon atom as the constitutive component; and n represents 0 or 1.

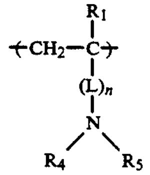

(II)

where $R_1$, L and n have the same meanings as those in formula (I);

$R_4$ and $R_5$ may be either the same or different from each other and each represents an alkyl group having from 1 to 12 carbon atoms, or an aralkyl group having from 7 to 20 carbon atoms;

or $R_4$ and $R_5$ may be bonded to each other to form a cyclic structure along with the adjacent nitrogen atom.

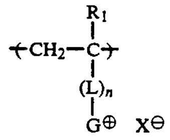

(III)

where $R_1$, L and n have the same meanings as those in formula (I);

$G^{\oplus}$ represents a quaternized heterocyclic group having a nitrogen atom with a double bond to a carbon atom as the constitutive component; and $X^{\ominus}$ represents a monovalent anion.

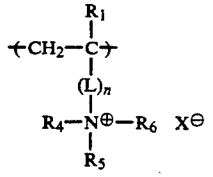

(IV)

where $R_1$, L and n have the same meanings as those in formula (I);

$R_4$ and $R_5$ have the same meanings as those in formula (II);

$R_6$ is selected from the groups of $R_4$ and $R_5$;

$X^{\ominus}$ has the same meaning as that in formula (III); and $R_4$, $R_5$ and $R_6$ may be bonded to each other to form a cyclic structure along with the adjacent nitrogen atom.

In formulae (I) to (IV), $R_1$ represents a hydrogen atom, or a lower alkyl group having from 1 to 6 carbon atoms, such as a methyl, ethyl, n-propyl, n-butyl, n-amyl or n-hexyl group. Preferably, $R_1$ is a hydrogen atom or a methyl group.

L represents a divalent linking group having from 1 to 20 carbon atoms, such as an alkylene group (e.g.,. methylene, ethylene, trimethylene, hexamethylene), a phenylene group (e.g., o-phenylene, p-phenylene, m-phenylene), an arylene-alkylene group (e.g.,

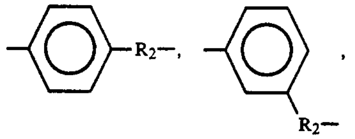

where $R_2$ represents an alkylene group having from 1 to about 12 carbon atoms), $-CO_2-$, $-CO_2-R_3-$ (where $R_3$ represents an alkylene group, a phenylene group, or an arylene-alkylene group), $-CONH-R_3-$ (where $R_3$ has the same meaning as that mentioned above), or $-CONR_1-R_3-$ (where $R_1$ and $R_3$ have the same meanings as those mentioned above). Especially preferred are

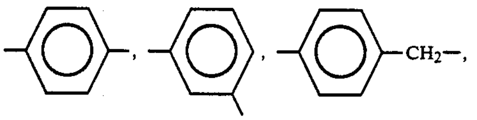

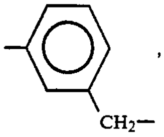

, $-CO_2-$, $-CONH-$, $-CO_2-CH_2CH_2-$, $-CO_2-CH_2CH_2CH_2-$, $-CONHCH_2-$, $-CONHCH_2CH_2-$, or $-CONHCH_2CH_2CH_2-$.

In formula (I), E represents a heterocyclic group having a nitrogen atom with a double bond to a carbon atom as the constitutive component, such as an imidazole ring (e.g.,

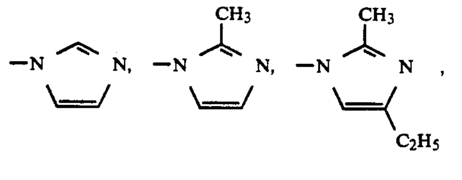

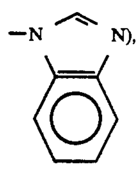

a triazole ring (e.g.,

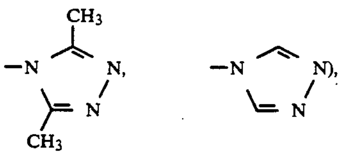

a pyrazole ring (e.g,

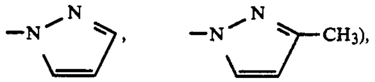

a pyridine ring (e.g.,

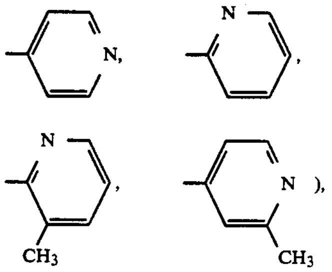

or a pyrimidine ring (e.g.,

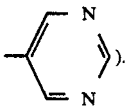

Especially preferred are an imidazole ring and a pyrimidine ring.

As preferred examples of polymers containing vinyl monomer units each having a tertiary amino group of formula (I), the following compounds are mentioned, in addition to mordants described in U.S. Pat. Nos. 4,282,305, 4,115,124 and 3,148,061 (in the following formulae, the number indicates molar %):

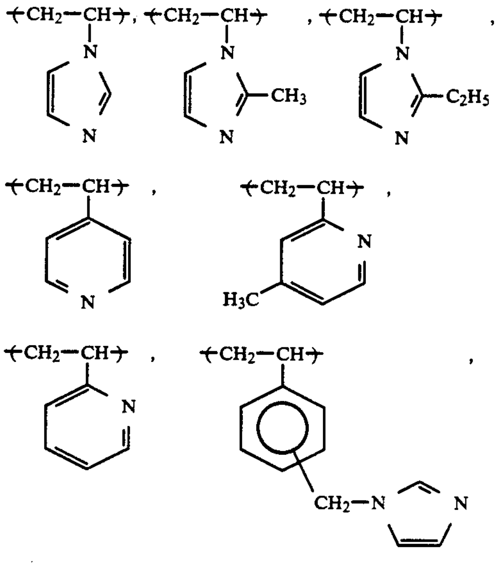

-continued

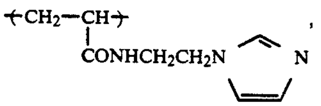

,

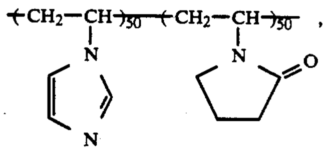

,

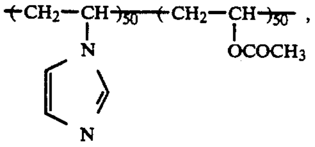

,

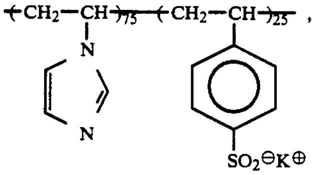

,

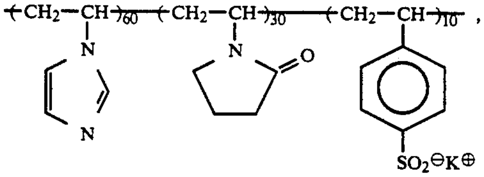

,

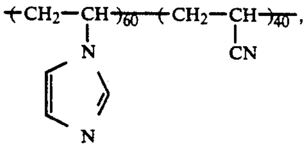

,

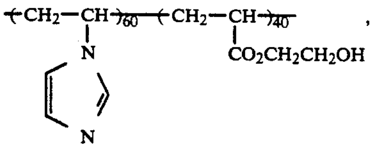

,

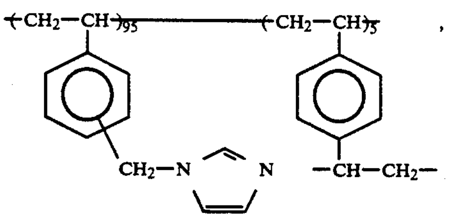

,

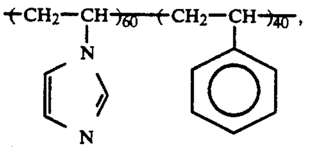

,

-continued

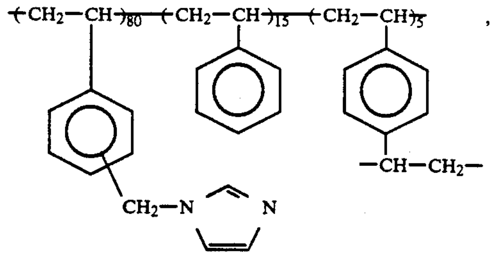

,

In formula (II), $R_4$ and $R_5$ each represent an alkyl group having from 1 to 12 carbon atoms, for example, an unsubstituted alkyl group (e.g., methyl, ethyl, n-propyl, n-butyl, n-amyl, hexyl, n-nonyl, n-decyl, n-dodecyl) or a substituted alkyl group (e.g., methoxyethyl, 3-cyanopropyl, ethoxycarbonylethyl, acetoxyethyl, hydroxyethyl, 2-butenyl); or an aralkyl group having from 7 to 20 carbon atoms, for example, an unsubstituted aralkyl group (e.g., benzyl, phenethyl, diphenylmethyl, naphthylmethyl) or a substituted aralkyl group (e.g., 4-methylbenzyl, 4-isopropylbenzyl, 4-methoxybenzyl, 4-(4-methoxyphenyl)benzyl 3-chlorobenzyl).

$R_4$ and $R_5$ may be bonded to each other to form a cyclic structure along with the adjacent nitrogen atom. As examples of such a cyclic structure, there are mentioned

or

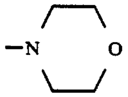

where m represents an integer of from 4 to 12.

Preferred examples of polymers containing vinyl monomer units each having a tertiary amino group of formula (I) are mentioned below (in the following formulae, the number indicates molar %):

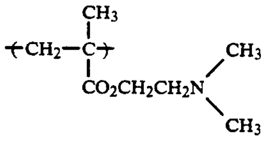

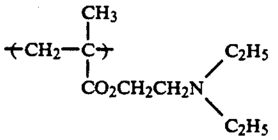

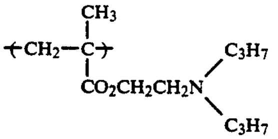

,

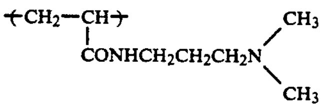

-continued

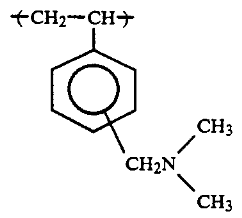

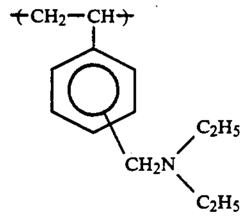

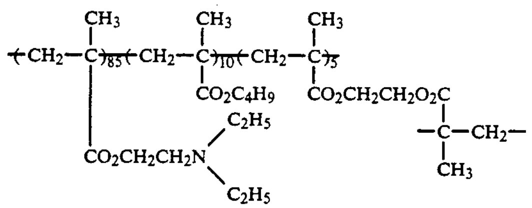

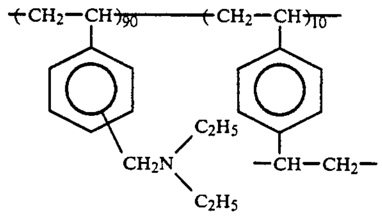

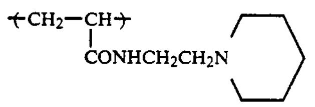

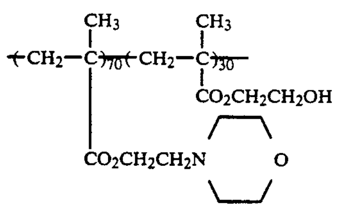

In formula (III), G⊕ represents a quaternized heterocyclic group having a nitrogen atom with a double bond to a carbon atom as the constitutive component, such as an imidazolium salt (e.g.,

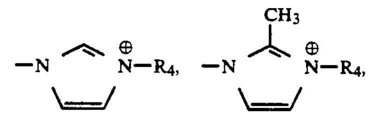

-continued

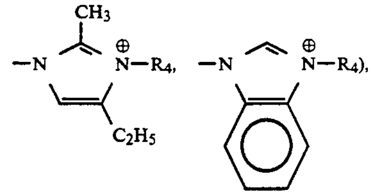

a triazolium salt (e.g.,

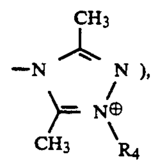

a pyridinium salt (e.g.,

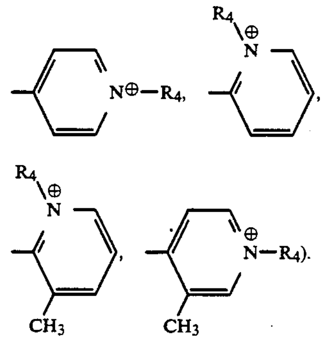

Above all, especially preferred are an imidazolium salt and a pyridinium salt. $R_4$ has the same meaning as that in formula (II), and it is especially preferable if $R_4$ is a methyl, ethyl or benzyl group.

In formulae (III) and (IV), $X^\ominus$ represents an anion, such as a halide ion (e.g., chloride, bromide, or iodide ion), an alkyl sulfate ion (e.g., methyl sulfate or ethyl sulfate ion), an alkyl or aryl sulfonate ion (e.g., methanesulfonate, ethanesulfonate, benzenesulfonate, or p-toluenesulfonate ion), an acetate ion or a sulfate ion. Especially preferred are a chloride ion and a p-toluenesulfonate ion.

As preferred examples of polymers containing vinyl monomer units each having a quaternary ammonio group of formula (III), the following compounds are mentioned, in addition to mordants described in British Patents 2,056,101, 2,093,041 and 1,594,961, and U.S. Pat. Nos. 4,124,386, 4,115,124, 4,273,853 and 4,450,224, and JP-A-48-28225 (in the following formulae, the number indicates molar %).

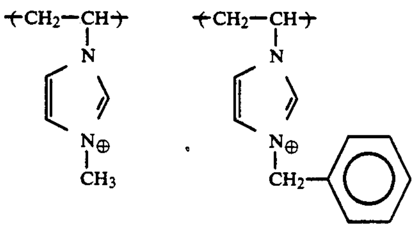

p-TsO⊖ Cl⊖

-continued
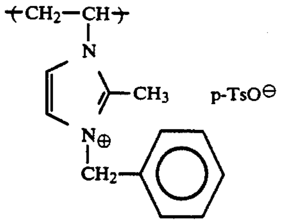
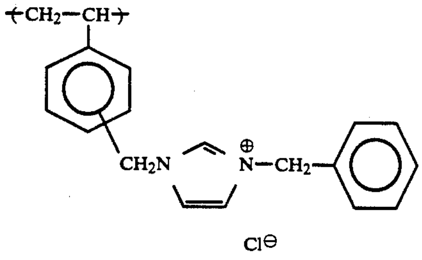
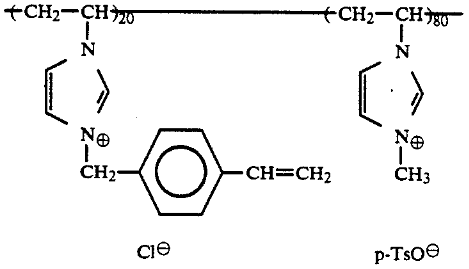
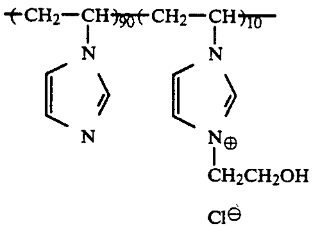
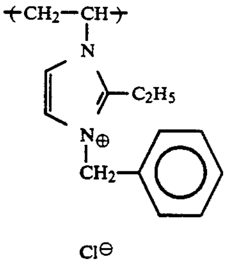
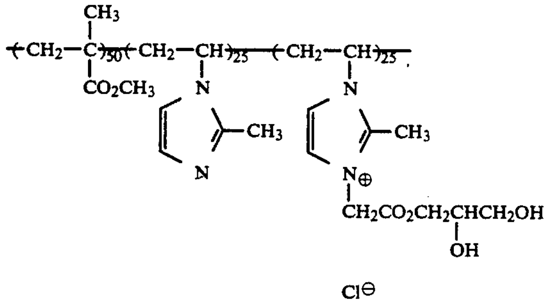
-continued
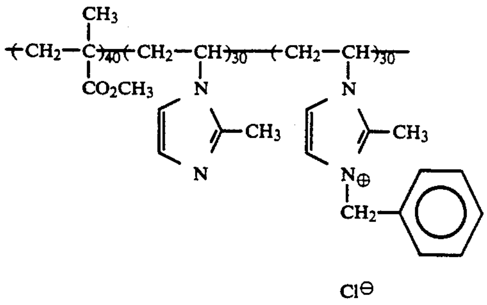
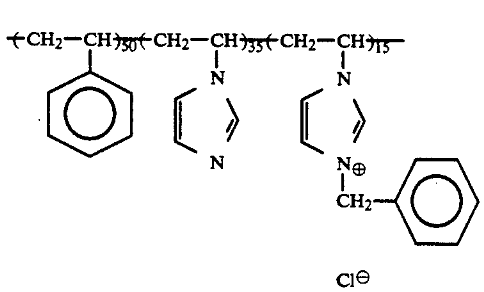
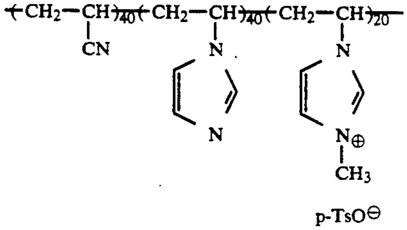
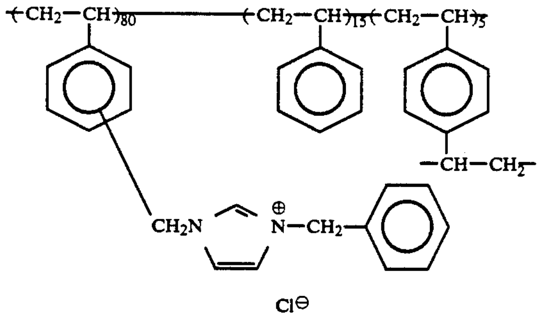
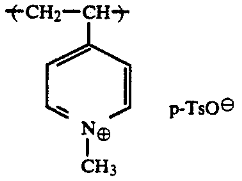
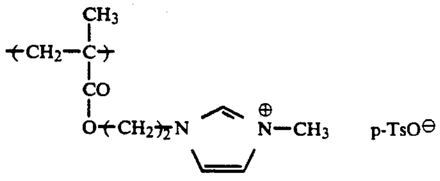

-continued

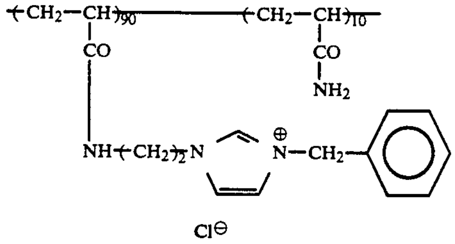

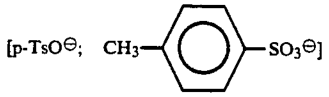

In formula (IV), $R_4$ and $R_5$ may be bonded to each other to form a cyclic structure along with the adjacent nitrogen atom, for example,

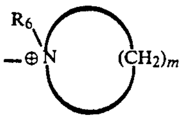
or
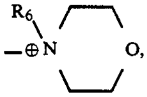

where m represents an integer of from 4 to 12. In the same formula (IV), $R_4$, $R_5$ and $R_6$ may together form a cyclic structure along with the adjacent nitrogen atom, for example,

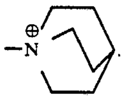

As preferred examples of polymers containing vinyl monomer units each having a quaternary ammonio group of formula (IV), the following compounds are mentioned, in addition to mordants described in U.S. Pat. Nos. 3,709,690, 3,898,088 and 3,958,995 (in the following formulae, the number indicates molar %):

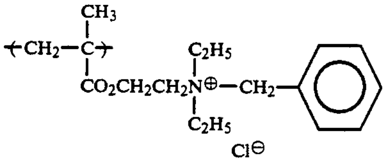

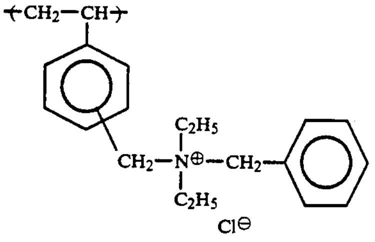

-continued

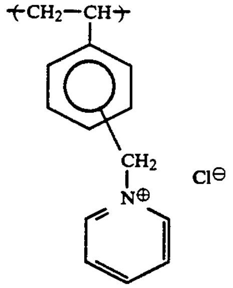

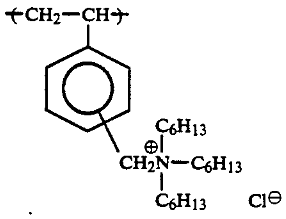

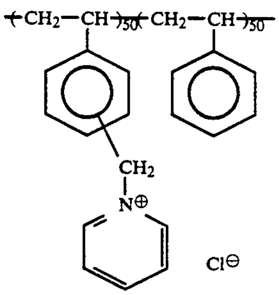

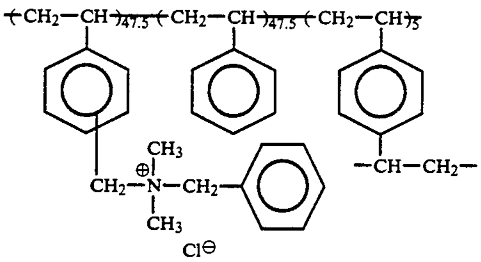

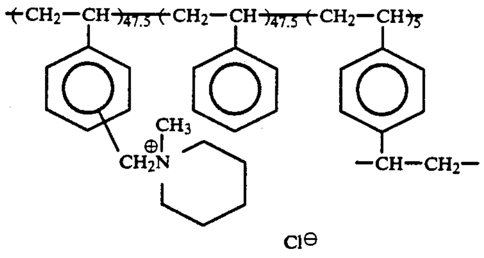

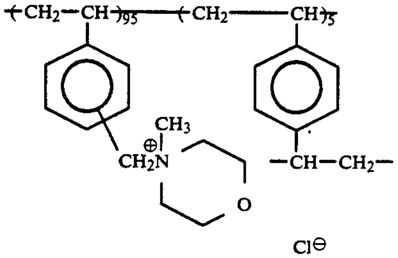

As other polymer mordants usable in the present invention, there are mentioned, for example, vinylpyridine polymers and vinylpyridinium cationic polymers, as disclosed in U.S. Pat. Nos. 2,548,564, 2,484,430, 3,148,061 and 3,756,814; polymer mordants capable of crosslinking with gelatin or the like, as disclosed in U.S. Pat. Nos. 3,625,694, 3,859,096 and 4,128,538, and British Patent 1,277,453; aqueous sol-type mordants, as disclosed in U.S. Pat. Nos. 3,958,995, 2,721,852 and 2,798,063, and JP-A-54-115228, JP-A-54-145529 and JP-A-54-126027; water-insoluble mordants, as disclosed in U.S. Pat. No. 3,898,088; reactive mordants capable of bonding with dyes by covalent bond, as disclosed in U.S. Pat. No. 4,168,976 (JP-A-54-137333); mordants as disclosed in U.S. Pat. Nos. 3,709,690, 3,788,855, 3,642,482, 3,488,706, 3,557,066, 3,271,147 and 3,271,148, and JP-A-50-71332, JP-A-53-30328, JP-A-52-155528, JP-A-53-125 and JP-A-53-1024; and, mordants as disclosed in U.S. Pat. Nos. 2,675,316 and 2,882,156.

The polymer mordants to be used in the present invention are preferably ones having a molecular weight of from 1,000 to 1,000,000, more preferably from 10,000 to 200,000.

The polymer mordant is incorporated into the dye-fixing layer of the dye-fixing element of the present invention, as a binder along with a hydrophilic colloid therein. As specific examples of a hydrophilic colloid to be used in the layer, there are mentioned synthetic substances, for example, proteins such as gelatin and gelatin derivatives, and polysaccharides such as cellulose derivatives, starch and gum arabic; and synthetic polymers such as polyvinyl alcohol, polyvinylpyrrolidone and polyacrylamide.

Above all, especially preferred are gelatin and/or polyvinyl alcohol.

The proportion of the polymer mordant to the hydrophilic colloid, as well as the amount of the polymer mordant to be coated, may easily be determined by anyone skilled in the art on the basis of the amount of the dye to be mordanted with the mordant, the composition of the polymer mordant, and the image forming method to be employed. Suitably, the ratio of mordant/hydrophilic colloid is from 20/80 to 80/20 (by weight), the amount of the mordant to be coated is from about 0.2 to about 15 $g/m^2$. Especially preferably, the amount is from 0.5 to 8 $g/m^2$.

The heat-developing photographic material to be employed in the present invention basically contains a light-sensitive silver halide and a binder on a support, and it may optionally additionally contain an organic metal salt oxidizing agent, a dye providing compound (which may be a reducing agent as mentioned below), etc.

These components are in most cases incorporated into one and the same layer, but they may be added separately to different layers provided that they are reactive with each other. For instance, if a colored dye providing compound is in the layer below a silver halide emulsion layer, it is effective for preventing lowering of the sensitivity of the emulsion layer. A reducing agent is preferably incorporated into a heat-developing photographic material. Alternatively, it may also be supplied to the material from an external source of a dye-fixing element by diffusing it to the material from a dye-fixing element.

In order to obtain colors of a broad range in a chromaticity diagram by using three primary colors of yellow, magenta and cyan, a combination of at least three silver halide emulsion layers, each having a light-sensitivity in a different spectral region, is used. For instance, usable are a combination of three layers of a blue-sensitive layer, a green-sensitive layer and a red-sensitive layer, and a combination of a green-sensitive layer, a red-sensitive layer and an infrared sensitive layer. The respective light-sensitive layers may be arranged in any desired sequence as generally employed in ordinary color photographic materials. These layers each may have two or more plural layers each having a different sensitivity.

The heat-developing photographic material may have other various auxiliary layers, such as protective layer, subbing layer, interlayer, yellow filter layer, anti-halation layer, and backing layer.

The silver halide for use in the present invention may be any one of silver chloride, silver bromide, silver iodobromide, silver chlorobromide, silver chloroiodide and silver chloroiodobromide.

The silver halide emulsion for use in the present invention may be either a surface latent image-type emulsion or an internal latent type-emulsion. The latter internal latent image type-emulsion is used as a direct reversal emulsion, in combination with a nucleating agent or with light fogging. The emulsion may also be a so-called core/shell emulsion in which the inside phase and the surface phase of each grain are different from each other. The silver halide emulsion may be either monodispersed or polydispersed. A mixture of plural monodispersed emulsions may also be used. The grain size of emulsion grains may be from 0.1 to 2 μm, more preferably from 0.2 to 1.5 μm. The crystal habit of silver halide grains may be any one of a cubic, octahedral or tetradecahedral shape, or a tabular shape having a high aspect ratio.

All silver halide emulsions as described in U.S. Pat. Nos. 4,500,626 (column 50) and 4,628,021, *Research Disclosure* (hereinafter referred to as RD), No. 17,029 (1978), and JP-A-62-253159 can be used in the present invention.

Silver halide emulsions may be used as primitive ones. In general, however, they are chemically sensitized before use. For instance, any known sulfur sensitization, reduction sensitization, noble metal sensitization and selenium sensitization (which are generally applied to emulsions of ordinary photographic materials) can be employed singly or in combination. Such chemical sensitization may also be effected in the presence of a nitrogen-containing heterocyclic compound (JP-A-62-253159).

The amount of light-sensitive silver halides to be coated in preparing the photographic material for use in the present invention may be from 1 to 10 $g/m^2$ in terms of silver.

In the present invention, an organic metal salt may be used as an oxidizing agent along with light-sensitive silver halides. Of such organic metal salts, especially preferred are organic silver salts.

As organic compounds to be used for forming such organic silver salt oxidizing agents, there are mentioned, for example, benzotriazoles, fatty acids and other compounds described in U.S. Pat. No. 4,500,626 (columns 52 to 53). In addition, silver salts of an alkynyl-group having carboxylic acids such as silver phenylpropiolate, as described in JP-A-60-113235, as well as acetylene silver, as described in JP-A-61-249044, are also useful. Two or more kinds of organic silver salts may be employed in combination.

The amount of the above-mentioned organic silver salt may be added to the emulsion in an amount of from 0.01 to 10 mols, preferably from 0.01 to 1 mol, per mol of the light-sensitive silver halide in the emulsion. The total amount of the light-sensitive silver halide and the organic silver salt to be coated is suitably from 50 mg/$m^2$ to 10 g/$m^2$ in terms of silver.

Various antifoggants and photographic stabilizers may be used in the present invention. As examples thereof, there are mentioned azoles and azaindenes described in RD No. 17643 (1978), pages 24 and 25; nitrogen-containing carboxylic acids and phosphoric acids described in JP-A-59-168442; mercapto compounds and metal salts thereof, as described in JP-A-59-111636; and acetylene compounds described in JP-A-62-87957.

Silver halides to be used in the present invention may be spectrally sensitized with methine dyes or others. As usable dyes for the purpose, there are mentioned cyanine dyes, merocyanine dyes, complex cyanine dyes, complex merocyanine dyes, holopolar cyanine dyes, hemicyanine dyes, styryl dyes and hemioxonol dyes.

Also mentioned are sensitizing dyes described in U.S. Pat. No. 4,617,257, JP-A-59-180550 and JP-A-60-140335, and RD No. 17029 (1978), pages 12 and 13.

These sensitizing dyes may be used singly or in combination. A combination of plural sensitizing dyes is often used for the purpose of supersensitization.

Dyes which do not have a spectral sensitizing activity by themselves, or compounds which do not substantially absorb visible rays but show a supersensitizing activity, may be incorporated into emulsions along with sensitizing dyes. (For instance, see the dyes or compounds described in U.S. Pat. No. 3,615,641 and JP-A-63-23145.)

The time for adding such sensitizing dyes into emulsions may be before or after chemical ripening of emulsions. As the case may be, it may be before or after formation of nuclei of silver halide grains, in accordance with U.S. Pat. Nos. 4,183,756 and 4,225,666. The amount of the dyes to be added is generally about $10^{-8}$ to $10^{-2}$ mol per mol of silver halide.

As the binder to be in the layers constituting the photographic material and dye-fixing element of the present invention, hydrophilic substances are preferably used. As examples thereof, those mentioned in JP-A-62-253159, pages 26 to 28 are referred to. Concretely, transparent or semi-transparent hydrophilic binders are preferred. For instance, there are mentioned natural compounds, such as proteins (e.g., gelatin, gelatin derivatives), and polysaccharides (e.g., cellulose derivatives, starch, gum arabic, dextran, pullulan); and synthetic high-molecular weight compounds such as polyvinyl alcohol, polyvinylpyrrolidone, acrylamide polymers and others. In addition, highly water-absorbing polymers described in JP-A-62-245260, such as homopolymers of vinyl monomers having —COOM or —$SO_3M$ (where M is a hydrogen atom or an alkali metal), or copolymers of such vinyl monomers or copolymers of such vinyl monomers along with other vinyl monomers (e.g., sodium methacrylate, ammonium methacrylate, Sumikagel L-5H produced by Sumitomo Chemical Co., Ltd.) may also be used. Such binders may be used in combination of two or more.

Where a system of heat-developing a photographic material with a slight amount of water is employed in carrying out the present invention, the photographic material of the present invention is desired to contain said highly water-absorbing polymer whereby absorption of water is rapidly effected. It is also preferred to incorporate said highly water-absorbing polymer into the dye-fixing layer and the protective layer therefor, whereby re-transferring the once transferred dye to any other material from the dye-fixing element may be prevented.

In accordance with the present invention, the amount of the hydrophilic binder to be coated is preferably 20 g or less, especially 10 g or less, more preferably 7 g or less, per $m^2$.

The layers (including backing layer) constituting the light-sensitive photographic material or the dye-fixing element of the present invention can contain various polymer latexes for the purpose of improving the film property of the material or element; for example, for the purpose of dimension stabilization, curling prevention, blocking prevention, film cracking prevention and prevention of pressure sensitization and desensitization (pressure marks). For instance, any of the polymer latexes described in JP-A-62-245258, JP-A-62-136648 and JP-A-62-110066 can be employed for this purpose. In particular, when a gas-polymer latex having a low glass transition point (40° C. or lower) is incorporated into the mordant layer, cracking of the mordant layer may be prevented; or when a polymer latex having a high glass transition point is incorporated into the backing layer, curling prevention can be attained.

As the reducing agent for use in the present invention, any one which is known in the field of heat-developing photographic materials can be employed. The agent includes also the dye providing compounds having a reducing property (which will be mentioned hereunder). In this case, any other reducing agent can be used, if desired, in combination with such reducing dye providing compound. In addition, reducing agent precursors which do not have a reducing property by themselves but may express a reducing capacity with the aid of a nucleophilic reagent, or under heat during the step of development procedure, may also be employed.

As examples of the reducing agents which can be employed in the present invention, reducing agents and reducing agent precursors as described in U.S. Pat. Nos. 4,500,626 (columns 49 and 50), 4,483,914 (columns 30 and 31), 4,330,617 and 4,590,152, JP-A-60-140355 (pages 17 and 18), JP-A-57-40245, JP-A-56-138736, JP-A-59-178458, JP-A-59-53831, JP-A-59-182449, JP-A-182450, JP-A-60-119555, JP-A-60-128436 through JP-A-60-128439, JP-A-60-198540, JP-A-60-181742, JP-A-61-259253, JP-A-62-244044, JP-A-62-131253 through JP-A-62-131256 and European Patent 220,746A2 (pages 78 to 96) are referred to.

Combination of various reducing agents as described in U.S. Pat. No. 3,039,869 can also be employed.

Where non-diffusive reducing agents are used in accordance with the present invention, an electron transfer agent and/or an electron transfer agent precursor can be used, if desired, in combination with such a reducing agent for the purpose of accelerating the movement of electrons between the non-diffusive reducing agent and the developable silver halide.

The electron transfer agent or precursor thereof to be used for the purpose can be selected from the above-mentioned reducing agents and precursors thereof. The electron transfer agent or precursor thereof is desired to have a higher mobility than the non-diffusive reducing agent (electron donor). Especially useful electron transfer agents are 1-phenyl-3-pyrazolidones and aminophenols.

The non-diffusive reducing agent (electron donor) to be employed in combination with the said electron transfer agent may be any one of the above-mentioned reducing agents which are not substantially mobile in the layers of a photographic material. Preferably, there are mentioned hydroquinones, sulfonamidophenols, sulfonamidonaphthols, compounds described in JP-A-53-110827 as electron donors, as well as non-diffusive and reducing dye providing compounds which will be mentioned hereunder.

In accordance with the present invention, the amount of the reducing agent to be added is from 0.01 to 20 mols, more preferably from 0.1 to 10 mols, per mol of silver.

In the present invention, silver can be employed as the image-forming substance. Further, the photographic material for use in the present invention can contain a compound which can form or release a mobile dye in correspondence or reverse correspondence with the reaction of reducing silver ion into silver under high temperature condition, i.e., a dye providing compound.

As examples of the dye providing compounds to be employed in the present invention, there are mentioned compounds (couplers) capable of forming a dye by oxidation-coupling reaction. The coupler may be either 4-equivalent or 2-equivalent. 2-Equivalent couplers which have a non-diffusive group as the split-off group, and which form a diffusive dye by oxidation-coupling reaction, are also preferred. The non-diffusive group may be in the form of a polymer chain. Examples of color developing agents and couplers for use in the present invention are described in detail in T. H. James, *The Theory of the Photographic Process*, 4th Ed., pages 291 to 334, and 354 to 361; and, in JP-A-58-123533, JP-A-58-149046, JP-A-58-149047, JP-A-59-111148, JP-A-59-124399, JP-A-59-174835, JP-A-59-231539, JP-A-59-231540, JP-A-60-2950, JP-A-60-2951, JP-A-60-14242, JP-A-60-23474 and JP-A-60-66249.

A further example of the dye providing compound includes a compound adapted to imagewise release or form of a diffusive dye. Compounds of such type can be represented by formula (LI):

$$(Dye-Y)_n-Z \quad (LI)$$

wherein Dye represents a dye group, or a dye group or dye precursor group whose wavelength has been shortened temporarily;

Y represents a chemical bond or a linking group;

Z represents a group which either causes an imagewise differential in the diffusibility of the compound $(Dye-Y)_n-Z$ in correspondence or reverse correspondence with the light-sensitive silver salt carrying a latent image, or releases the Dye and causes a differential in diffusibility between the released Dye and $(Dye-Y)_n-Z$; and n represents 1 or 2, and when n is equal to 2, the two Dye—Y groups may be the same or different.

As specific examples of the dye providing compounds of formula (LI), the following compounds (1) through (5) are mentioned. Compounds (1) through (3) are those forming a diffusive color image (positive color image) in reverse correspondence with development of silver halide; and compounds (4) and (5) are those forming a diffusive color image (negative color image) in correspondence with the development of silver halide.

(1) Color-developing agents comprising a combination of a hydroquinone developing agent and a dye component, as described in U.S. Pat. Nos. 3,134,764, 3,362,819, 3,597,200, 3,544,545 and 3,482,972. The color-developing agents are diffusive under an alkaline condition but become non-diffusive after reaction with a silver halide.

(2) Non-diffusive compounds, which may release a diffusive dye under an alkaline condition but which lose the capacity when reacted with a silver halide, can also be used, as so described in U.S. Pat. No. 4,503,137. As examples of such compounds, there are mentioned compounds releasing a diffusive dye by intramolecular nucleophilic displacement reaction, as described in U.S. Pat. No. 3,980,479; and compounds releasing a diffusive dye by intramolecular rearrangement reaction of the isoxazolone ring in the molecule, as described in U.S. Pat. No. 4,199,354.

(3) Non-diffusive compounds capable of reacting with a reducing agent which has remained without being oxidized by development to release a diffusive dye can also be used, as so described in U.S. Pat. No. 4,559,290, European Patent 220,746A2, U.S. Pat. No. 4,783,396, and Kokai Giho 87-6199.

As examples of such compounds, there are mentioned compounds releasing a diffusive dye by intramolecular nucleophilic displacement reaction after reduction, as described in U.S. Pat. Nos. 4,139,389 and 4,139,379 and JP-A-59-185333 and JP-A-57-84453; compounds releasing a diffusive dye by intramolecular electron-migrating reaction after reduction, as described in U.S. Pat. No. 4,232,107, JP-A-59-101649 and JP-A-61-88257 and RD No. 24025 (1984); compounds releasing a diffusive dye by cleavage of the single bond after reduction, as described in German Patent 3,003,588A, JP-A-56-142530, and U.S. Pat. Nos. 4,343,893 and 4,619,884; nitro compounds releasing a diffusive dye after electron reception, as described in U.S. Pat. No. 4,450,223; and compounds releasing a diffusive dye after electron reception, as described in U.S. Pat. No. 4,609,610.

More preferably, there are mentioned compounds having an N-X bond (where X means an oxygen, sulfur or nitrogen atom) and an electron-attracting group in one molecule, as described in European Patent 220,746A2, Kokai Giho 87-6199, U.S. Pat. No. 4,783,396, and JP-A-63-201653 and JP-A-63-201654; compounds having $SO_2$-X (where X has the same meaning as mentioned above) and an electron-attracting group in one molecule, as described in JP-A-1-26842; compounds having a PO-X bond (where X has the same meaning as mentioned above) and an electron-attracting group in one molecule, as described in JP-A-63-271344; and compounds having a C-X' bond (where X' has the same meaning as mentioned above for X or means $-SO_2-$) and an electron-attracting group in one molecule, as described in JP-A-63-271341. In addition, also usable are compounds releasing a diffusive dye by cleavage of the single bond after reduction due to the $\pi$-bond conjugating with an electron-receiving group, as described in JP-A-1-161237 and JP-A-1-161342.

Above all, especially preferred are compounds having an N-X bond and an electron-attracting group in one molecule. Specific examples of such compounds include Compounds (1) to (3), (7) to (10), (12), (13), (15), (23) to (26), (31), (32), (35), (36), (40), (41), (44), (53) to (59), (64) and (70) described in European Patent 220,746A2 and U.S. Pat. No. 4,783,396, and Compounds (11) to (23) described in Kokai Giho 87-6199.

(4) Compounds (DDR couplers) which have a diffusive dye as the split-off group and release the diffusive dye by reaction with an oxidation product of a reducing agent are also used. Examples of such compounds are described in British Patent 1,330,524, JP-B-48-39165 and U.S. Pat. Nos. 3,443,940, 4,474,877 and 4,483,914.

(5) Compounds (DRR compounds) which have a property of reducing silver halides and organic silver salts, and which release a diffusive dye after having reduced the halides or salts, can also be used. As the compounds of the type which may function even in the absence of any other reducing agent, they are advantageously free from the problem of image stain, which is caused by the oxdation and decomposition product of a reducing agent. Specific examples of the compounds are described in U.S. Pat. Nos. 3,928,312, 4,053,312, 4,055,428 and 4,336,322, JP-A-59-65839, JP-A-59-69839, JP-A-53-3819 and JP-A-51-104343, RD No. 17645, U.S. Pat. Nos. 3,725,062, 3,728,113 and 3,443,939, JP-A-58-116537 and JP-A-57-179840, and U.S. Pat. No. 4,500,626. As preferred examples of such DRR compounds, compounds described in the above-mentioned U.S. Pat. No. 4,500,626, columns 22 to 44 are referred to. Above all, Compounds (1) to (3), (10) to (13), (16) to (19), (28) to (30), (33) to (35), (38) to (40) and (42) to (64), as described in said U.S. Patent, are preferred. In addition, compounds described in U.S. Pat. No. 4,639,408, columns 37 to 39 are also useful.

As other dye providing compounds than the above-mentioned couplers and the compounds of formula (LI), dye-silver compounds comprising an organic silver salt bonded to a dye (RD of May 1978, pages 54 to 58), azo dyes employable in a heat-developing silver dye bleaching method (U.S. Pat. No. 4,235,957, RD of April 1976, pages 30 to 32) and leuco dyes (U.S. Pat. Nos. 3,985,565 and 4,022,617) can also be employed in the present invention.

The dye providing compound, non-diffusive reducing agent and other hydrophobic additives are incorporated into the layers of the photographic material by any known method, for example, by the method described in U.S. Pat. No. 2,322,027. In this case, high boiling point organic solvents such as those described in JP-A-59-83154, JP-A-59-178451, JP-A-59-178452, JP-A-59-178453, JP-A-59-178454, JP-A-59-178455 and JP-A-59-178457, can be used together with low boiling point organic solvents having a boiling point of 50° C. to 60° C.

The amount of the high boiling point organic solvent to be used in this case is 10 g or less, preferably 5 g or less, per gram of the dye providing compound. It is suitably one cc or less, more suitably 0.5 cc or less, especially suitably 0.3 cc or less, per gram of the binder.

In addition, a dispersion method with a polymer, as described in JP-B-51-39853 and JP-A-51-59943, may also be employed.

Where the compound to be incorporated into the layers is substantially insoluble in water, it may be dispersed in the binder in the form of fine grains, apart from the above-mentioned methods.

Where the hydrophobic compound is dispersed in a hydrophilic colloid, various surfactants may be used. For instance, surfactants mentioned in JP-A-59-157636, pages 37 to 38 may be used.

The photographic material of the present invention can contain a compound which activates the developability thereof and stabilizes the image formed. Examples of such compounds, which can preferably be employed in the present invention, are described in U.S. Pat. No. 4,500,626, columns 51 to 52.

In the system of forming an image by diffusion transfer of the dye, a dye-fixing element is employed together with the light-sensitive photographic material. The system may be classified into two major categories: 1. One format in which the light-sensitive photographic material and the dye-fixing element are separately disposed on two independent supports; and 2. a second format in which the both are provided as coating layers on one and the same support. In regard to the relation between the light-sensitive photographic material and the dye-fixing element, the relation thereof to the support and the relation thereof to the white reflective layer, those described in U.S. Pat. No. 4,500,626, column 57, are applicable to the present invention.

The dye-fixing element, which is preferably used in the present invention, has at least one layer containing a mordant and a binder. As the mordant, any known in the photographic field can be employed, and specific examples thereof include mordants described in U.S. Pat. No. 4,500,626, columns 58 and 59, and JP-A-61-88256, pages 32 to 41; and those described in JP-A-62-244043 and JP-A-62-244036. In addition, dye-receiving high molecular weight compounds, for example, as described in U.S. Pat. No. 4,463,079, can also be employed.

The dye-fixing element may optionally have, if desired, auxiliary layers such as a protective layer, a peeling layer, and a curling preventing layer. In particular, providing a protective layer is helpful.

The layers constituting the light-sensitive photographic material and dye-fixing element can contain a high boiling point organic solvent as a plasticizer, a sliding agent, or an agent which improves the peeling of the photographic material and the dye-fixing element from each other. Concretely, compounds described in JP-A-62-253159, page 25, and JP-A-62-245253, are referred to.

Moreover, various kinds of silicone oils (which may all be silicone oils including dimethylsilicone oil and modified silicone oils formed by introducing various organic groups into dimethylsiloxane) can also be used for the same purpose as above. As examples of such silicone oils, there are mentioned various modified silicone oils described in *Technical Reference of Modified Silicone Oils* (published by Shin-Etsu Silicone Co., Ltd.), pages 6–18B. Above all, carboxy-modified silicone oil (trade name: X-22-3701) is effective.

Further, silicone oils described in JP-A-62-215958 and JP-A-63-46449, are also useful.

The light-sensitive photographic material and the dye-fixing element can contain an anti-fading agent. Such an anti-fading agent includes an antioxidant, an ultraviolet absorbent as well as various kinds of metal complexes.

As examples of the antioxidant, there are mentioned chroman compounds, coumaran compounds, phenol compounds (e.g., hindered phenols), hydroquinone derivatives, hindered amine derivatives and spiroindane compounds. Compounds described in JP-A-61-159644 are also effective.

As examples of the ultraviolet absorbent, there are benzotriazole compounds (U.S. Pat. No. 3,533,794), 4-thiazolidone compounds (U.S. Pat. No. 3,352,681), benzophenone compounds (JP-A-46-2784) and other compounds described in JP-A-54-48535, JP-A-62-136641 and JP-A-61-88256. Further, ultraviolet-absorbing polymers described in JP-A-62-260152 are also effective.

As examples of the metal complexes, there are mentioned compounds described in U.S. Pat. Nos. 4,241,155, 4,245,013 (columns 3 to 36) and 4,254,195 (columns 3 to 8), JP-A-62-174741 and JP-A-61-88256 (pages 27 to 29), JP-A-63-199248, JP-A-1-75568 and JP-A-1-74272.

Examples of useful anti-fading agents are described in JP-A-62-215272 (pages 125 to 137).

The anti-fading agent for preventing the dye, as transferred to the dye-fixing element, from fading may previously be incorporated into the dye-fixing element or, alternatively, it may be supplied to the dye-fixing element from an external source of a light-sensitive photographic material containing the agent.

The above-mentioned antioxidant, ultraviolet absorbent and metal complex can be employed in the present invention in the form of a combination thereof.

The light-sensitive photographic material and the dye-fixing element can contain a fluorescent brightening agent. In particular, it is preferred to incorporate a fluorescent brightening agent in the dye-fixing element or to supply the same to the said element from an external source of a light-sensitive photographic material containing the agent. As examples of the agent, compounds described in K. Veenkataraman, *The Chemistry of Synthetic Dyes*, Vol. V, Chap. 8, and JP-A-61-143752 are referred to. Specifically, there are mentioned stilbene compounds, coumarin compounds, biphenyl compounds, benzoxazolyl compounds, naphthalimide compounds, pyrazoline compounds and carbostyryl compounds.

The fluorescent brightening agent can be employed in combination with the anti-fading agent.

The layers constituting the light-sensitive photographic material and dye-fixing element can contain a hardening agent. As examples thereof, hardening agents described in U.S. Pat. No. 4,678,739 (column 41) and JP-A-59-116655, JP-A-62-245261 and JP-A-61-18942, are mentioned. Specifically, there are mentioned aldehyde hardening agents (e.g., formaldehyde), aziridine hardening agents, epoxy hardening agents, vinylsulfone hardening agents (e.g., N,N'-ethylene-bis(vinylsulfonylacetamino)-ethane), N-methylol hardening agents (e.g., dimethylolurea) and high molecular weight hardening agents (e.g., compounds described in JP-A-62-234157).

The layers constituting the light-sensitive photographic material and dye-fixing element can contain various surfactants for various purposes, such as: a coating aid, improvement of peeling property, improvement of slide property, prevention of static charges, and enhancement of developability. Specific examples of such surfactants are described in JP-A-62-173463 and JP-A-62-183457.

The layers constituting the light-sensitive photographic material and dye-fixing element can contain organic fluorine compounds for the purpose of improvement of slide property, prevention of static charges and improvement of peeling property. As specific examples of such organic fluorine compounds, there are mentioned fluorine surfactants described in JP-B-57-9053 (columns 8 to 17) and JP-A-61-20944 and JP-A-62-135826, as well as hydrophobic fluorine compounds, such as: fluorine oils and the like; oily fluorine compounds and tetrafluoroethylene resins and the like; and, solid fluorine compound resins.

The light-sensitive photographic material and dye-fixing element can contain a mat agent. As the mat agent, there are mentioned silicone dioxide and compounds described in JP-A-61-88256 (page 29), such as: polyolefins or polymethacrylates; and, compounds described in JP-A-63-274944 and JP-A-63-274952, such as benzoguanamine resin beads, polycarbonate resin beads, and AS resin beads.

In addition, the layers constituting the light-sensitive photographic material and dye-fixing element may further contain a heat solvent, a defoaming agent, a microbicidal, a fungicidal agent, a colloidal silica and other additives. Examples of such additives are described in JP-A-61-88256 (pages 26 to 32).

In accordance with the present invention, the light-sensitive photographic material and/or the dye-fixing element can contain an image formation accelerator. The image formation accelerators include those which promote the redox reaction between a silver salt oxidizing agent and a reducing agent, those which promote the reactions involving forming a dye from a dye providing substance, or decomposing a dye or releasing a diffusive dye, and those which promote the migration of a dye from the light-sensitive layer to the dye-fixing layer. Classified by physicochemical function, the image formation accelerators can be classified into bases or base precursors, nucleophilic compounds, high boiling point organic solvents (oils), heat solvents, surfactants, and compounds which interact with silver or silver ions, for instance. However, each of these substances generally has plural functions and provides several of the above-mentioned effects. A detailed discussion on these substances can be found in U.S. Pat. No. 4,678,739, columns 38 to 40.

As the base precursor, there are mentioned salts of an organic acid which may be decarboxylated under heat and a base, as well as compounds capable of releasing an amine by intramolecular nucleophilic displacement reaction, Rossen rearrangement or Beckmann rearrangement. Specific examples thereof are described in U.S. Pat. No. 4,511,493 and JP-A-62-65038.

In the system where heat-development and dye transfer are effected simultaneously in the presence of a small amount of water, it is preferred to incorporate the base and/or base precursor in the dye-fixing element for the purpose of improving the storage stability of the light-sensitive photographic material.

In addition, a combination of a hardly soluble metal compound and a compound capable of complexing with the metal ion which constitutes said hardly soluble metal compound (hereinafter referred to as a "complex-forming compound"), as described in European Patent 210,660A and U.S. Pat. No. 4,740,445, as well as compounds giving a base by electrolysis as described in JP-A-61-232451, can also be used as the base precursor. Use of the former is especially effective. The hardly soluble metal compound and the complex-forming compound are advantageously added separately to different light-sensitive photographic material and dye-fixing elements.

The light-sensitive photographic material, and/or the dye-fixing element of the present invention, can contain various development stopping agents for the purpose of always obtaining constant images despite fluctuation of the development temperature and the processing time in development.

The terminology "development stopping agent", as used herein, means a compound which, after proper development, quickly neutralizes a base or reacts with a base to lower the base concentration in the layer and stops the development, or is a compound which interacts with silver and a silver salt to arrest development. Specifically, there are mentioned acid precursors which release an acid under heat, electrophilic compounds which react with the existing base by displacement reaction under heat, as well as nitrogen-containing heterocyclic compounds, mercapto compounds and precursors thereof. More precisely, specific examples of these compounds are described in JP-A-62-253159 (pages 31 to 32).

The support, which is employable in preparing the light-sensitive photographic material and dye-fixing element of the present invention, may be any support that withstands the processing temperature. In general, paper and synthetic high molecular weight films are used as the support. Specifically, the support includes films of polyethylene terephthalate, polycarbonates, polyvinyl chloride, polystyrene, polypropylene, polyimide, celluloses (e.g., triacetyl cellulose) and those films containing a pigment such as titanium oxide. Specific examples of the paper which may be used in the support are synthetic papers made of polypropylene by a filming method, mixed paper made of a synthetic resin pulp (e.g., polyethylene) and a natural pulp, and, Yankee paper, baryta paper, coated paper (especially cast-coated paper), metals, clothes and glasses.

These supports may be used directly as they are, or may be used in the form as coated with a synthetic high molecular weight substance (e.g., polyethylene) on one surface or both surfaces thereof.

In addition, supports described in JP-A-62-253159, pages 29 to 31, can also be employed in the present invention.

The surface of the support may be coated with a hydrophilic binder and a semiconductive metal oxide (e.g., alumina sol or tin oxide) or an antistatic agent such as carbon black.

For imagewise exposing and recording the photographic material of the present invention, various methods can be employed, which include, for example, a method of directly photographing a scene or portrait with a camera; a method of exposing an image through a reversal film or negative film by the use of a printer or an enlarger; a method of scanning and exposing an original through a slit by the use of an exposing device of a duplicator; a method of exposing an image information via the corresponding electric signal by emitting the same with an emitting diode or various lasers; and, a method of outputting an image information with an image display device such as CRT, liquid crystal display, electroluminescence display or plasma display and then exposing the same directly or via some optical system.

As the light source to be used for recording an image on the photographic material, those described in U.S. Pat. No. 4,500,626 (column 56), such as natural light, tungsten lamp, light-emitting diode, laser rays and CRT rays can be employed, as mentioned above.

A wavelength converting element comprising a combination of a non-linear optical material and a coherent light source, such as laser rays, can also be used for image exposure. The terminology "non-linear optical material", as used herein, means a material capable of expressing non-linear property between the polarization to be caused by some strong photoelectric field, such as laser rays, and the electric field. As such material, inorganic compounds such as lithium niobate, potassium dihydrogenphosphate (KDP), lithium iodate and $BaB_2O_4$, as well as urea derivatives, nitroaniline derivatives, nitropyridine-N-oxide derivatives (e.g., 3-methyl-4-nitropyridine-N-oxide (POM)) and compounds described in JP-A-61-53462 and JP-A-62-210432, are preferably employed in the present invention. As the form of the wavelength converting element, a single crystal optical wave-guide type-one and a fiber type-one are known; both of which are employable in the present invention.

As the image information to be applicable to the photographic material of the present invention, any image signals to be obtained from a video camera or electronic still camera, television signals as standardized by Nippon Television Signal Standard Code (NTSC), image signals obtained by dividing an original into plural pixels with a scanner, and image signals formed by the use of a computer such as CG or CAD, can be employed.

The light-sensitive photographic material and/or the dye-fixing element may be in such form that has an electroconductive heating diffusion and transfer of the formed dyes. In this case, the heating element may be either transparent or opaque, and elements described in JP-A-61-145544 can be employed. The electroconductive layer acts also as an antistatic layer.

The heating temperature in the heat-development step may be approximately 50° C. to 250° C. It is especially effective if the temperature is approximately 80° C. to 180° C. The step of diffusing and transferring the dye formed by the development may be effected simultaneously with the heat-development step or after the same. In the latter case, the heating temperature in the transfer step may be in the range of the temperature in the previous heat-development step to room temperature. Preferably, it is from 50° C. to a temperature lower than the temperature in the heat-development step by about 10° C.

Migration of the dye formed may be effected only by heat, but a solvent may be used for the purpose of accelerating the migration of the dye. Further, as described in detail in JP-A-59-218443 and JP-A-61-238056, a method where development and transfer are carried out in the presence of a small amount of a solvent (especially, water) under heat, either at the same time or in a continuous sequence, can be advantageously utilized. In this method, the heating temperature is preferably not lower than 50° C. and not higher than the boiling point of the solvent used. For instance, where the solvent is water, the temperature is desirably from 50° C. to 100° C.

As examples of the solvents to be used for acceleration of development and/or migration of the diffusive dye formed to the dye-fixing element, there is mentioned water and an aqueous basic solution containing an inorganic alkali metal salt or an organic base. As the bases, those already mentioned for the image formation accelerators can be employed. In addition, a low boiling point solvent, or a mixed solution comprising a low boiling point solvent and water or an aqueous basic solution can also be used. Further, surfactants, antifoggants, as well as hardly soluble metals and complex-forming compounds, can be incorporated into the solvents.

The solvent can be used by applying the same to either the dye-fixing element or the light-sensitive photographic material or to both of them. The amount thereof to be used may be a small amount or less than the weight of the solvent corresponding to the maximum swollen volume of the total coated layers (especially less than the amount obtained by subtracting the weight of the total coated layers from the weight of the solvent corresponding to the maximum swollen volume of the total coated layers).

As a method of applying the solvent to the light-sensitive layer or the dye-fixing layer, for example, a method described in JP-A-61-147244 (page 26) can be employed. Apart from this, the solvent can be incorporated into either the light-sensitive photographic material or the dye-fixing element, or into both of them, in the form of solvent-containing microcapsules.

In order to accelerate migration of the dye formed, a system of incorporating a hydrophilic heat solvent, which is solid at room temperature but may melt at a high temperature into a light-sensitive photographic material or into a dye-fixing element, may also be employed in the present invention. In employing the system, the hydrophilic heat solvent may be incorporated into either the light-sensitive photographic material or the dye-fixing element, or into both of them. The layer to which the solvent is added may be any of the emulsion layer, interlayer, protective layer and dye-fixing layer, but the solvent is preferably added to the dye-fixing layer and/or the adjacent layer(s).

As examples of the heat solvent to be employed in the system, there are mentioned ureas, pyridines, amides, sulfonamides, imides, alcohols, oximes and other heterocyclic compounds.

Also for accelerating migration of the dye formed, a high boiling point organic solvent may be incorporated into the light-sensitive photographic material and/or the dye-fixing element.

For heating the material and/or the element in the development step and/or the transfer step, the material and/or the element may be contacted with a heated block or plate, or with a hot plate, hot presser, hot roller, halogen lamp heater or infrared or far-infrared lamp heater, or may be passed through a high temperature atmosphere.

Where the light-sensitive photographic material is attached to the dye-fixing element and combined together under pressure, a method described in JP-A-61-174244 (page 27) is applicable to the present case with respect to the pressure condition and the means of pressing the combined material and element.

For processing the photographic elements of the present invention, any general heat-developing apparatus can be utilized. For instance, apparatus described in JP-A-59-75247, JP-A-59-177547, JP-A-59-181353 and JP-A-60-18951, and JP-U-A-62-25944 are preferably employed.

The present invention will be explained in more detail with reference to the following examples, which, however, are not intended to restrict the scope of the present invention.

EXAMPLE 1

A photographic element sample having the layer constitution mentioned below was prepared to be Photographic Element sample A.

| Layer Constitution of Sample A: | |
|---|---|
| Support: | |
| Polyethylene Terephthalate (96 μm), with backing layer coated with carbon black. | |
| First Layer: Red-Sensitive Emulsion Layer | |
| Red-sensitive Silver Halide Emulsion | 230 mg/m$^2$ as Ag |
| Cyan Dye Providing Compound (3) | 343 mg/m$^2$ |
| Gelatin | 330 mg/m$^2$ |
| Electron Donor (1) | 163 mg/m$^2$ |
| High Boiling Point Solvent (1) | 172 mg/m$^2$ |
| Electron Transfer Agent (1) | 28 mg/m$^2$ |
| Electron Transfer Agent Precursor (1) | 17 mg/m$^2$ |
| Antifoggant (3) | 0.7 mg/m$^2$ |
| Second Layer: Interlayer | |
| Gelatin | 790 mg/m$^2$ |
| Zinc Hydroxide | 300 mg/m$^2$ |
| Electron Donor (2) | 130 mg/m$^2$ |
| High Boiling Point Solvent (1) | 73 mg/m$^2$ |
| Surfactant (2) | 100 mg/m$^2$ |
| Active Charcoal | 25 mg/m$^2$ |
| Third Layer: Green-Sensitive Emulsion Layer | |
| Green-Sensitive Silver Halide Emulsion | 220 mg/m$^2$ as Ag |
| Magenta Dye Providing Compound (2) | 365 mg/m$^2$ |
| Gelatin | 310 mg/m$^2$ |
| Electron Donor (1) | 158 mg/m$^2$ |
| High Boiling Point Solvent (1) | 183 mg/m$^2$ |
| Electron Transfer Agent (1) | 27 mg/m$^2$ |
| Electron Transfer Agent Precursor (1) | 15 mg/m$^2$ |
| Antifoggant (2) | 0.3 mg/m$^2$ |
| Fourth Layer: Interlayer | |
| Gelatin | 700 mg/m$^2$ |
| Electron Donor (2) | 130 mg/m$^2$ |
| High Boiling Point Solvent (1) | 48 mg/m$^2$ |
| Surfactant (2) | 61 mg/m$^2$ |
| Electron Transfer Agent (1) | 27 mg/m$^2$ |
| Electron Transfer Agent (2) | 36 mg/m$^2$ |
| Hardening Agent (1) | 37 mg/m$^2$ |
| Fifth Layer: Blue-Sensitive Emulsion Layer | |
| Blue-Sensitive Silver Halide Emulsion | 380 mg/m$^2$ as Ag |
| Yellow Dye Providing Compound (1) | 400 mg/m$^2$ |
| Gelatin | 600 mg/m$^2$ |
| Electron Donor (1) | 303 mg/m$^2$ |
| High Boiling Point Solvent (1) | 200 mg/m$^2$ |
| Electron Transfer Agent Precursor (1) | 15 mg/m$^2$ |
| Zinc Hydroxide | 330 mg/m$^2$ |
| Antifoggant (1) | 0.6 mg/m$^2$ |
| Sixth Layer: Protective Layer | |
| Gelatin | 900 mg/m$^2$ |
| Silica (grain size 4 μm) | 40 mg/m$^2$ |
| Zinc Oxide | 600 mg/m$^2$ |
| Surfactant (1) | 130 mg/m$^2$ |

Compounds used in preparing Sample A are mentioned below.

Surfactant (1)

Antifoggant (1)

-continued
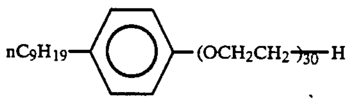
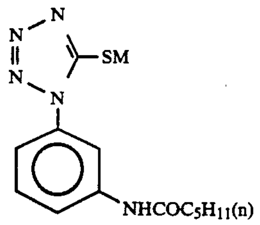
Electron Donor (1)
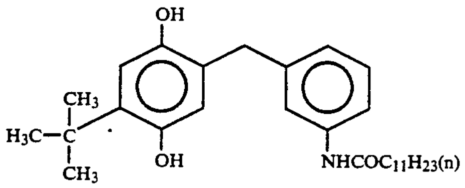
High Boiling Point Solvent (1)
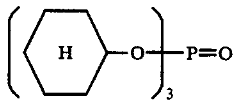
Electron Transfer Agent Precursor (1)
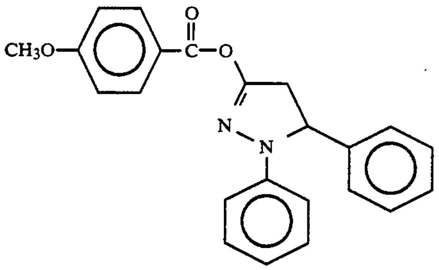
Surfactant (2)
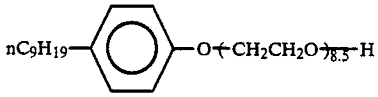
Electron Transfer Agent (1)
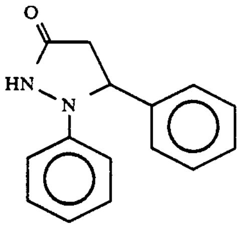
Electron Transfer Agent (2)
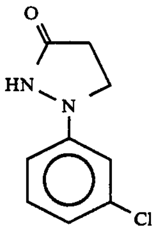
Hardening Agent (1)
3/1 Mixture of (1)-1/(1)-2
(1)-1
$CH_2{=}CHSO_2CH_2CONH(CH_2)_2NHCOCH_2SO_2CH{=}CH_2$
(1)-2
$CH_2{=}CHSO_2CH_2CONH(CH_2)_3NHCOCH_2SO_2CH{=}CH_2$
Antifoggant (2)
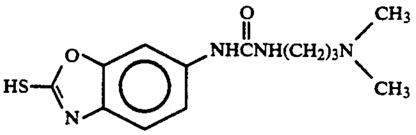
Antifoggant (3)
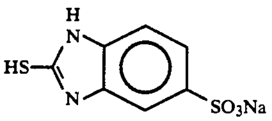
Electron Donor (2)
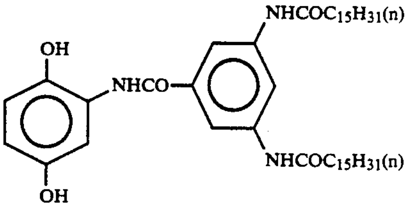
Yellow Dye Providing Compound (1)

-continued

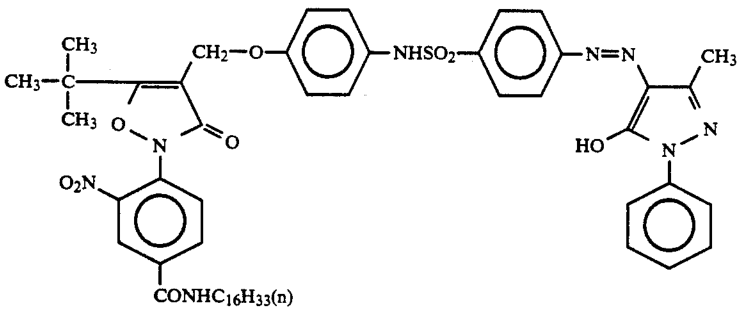

Magenta Dye Providing Compound (2)

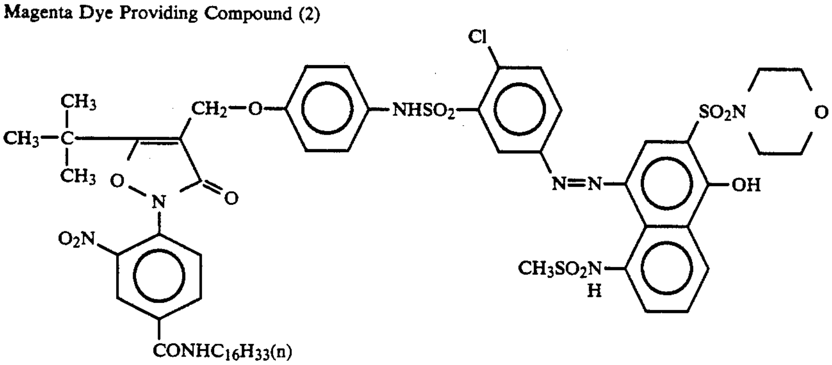

Cyan Dye Providing Compound (3)

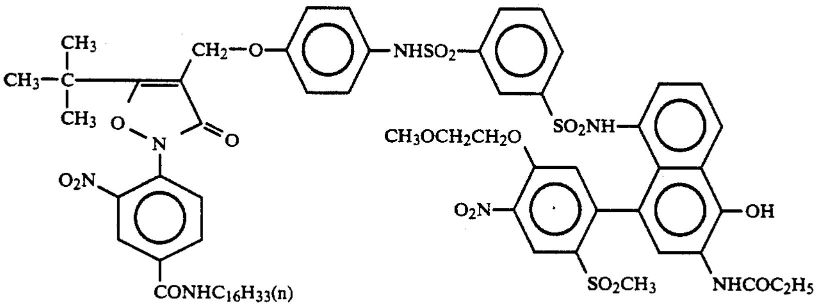

A dye-fixing element sample having the layer constitution mentioned in Table 1-A below was prepared to Dye-Fixing Element Sample 100.

TABLE 1-A

| Layer Constitution of Sample 100 |
|---|
| Surface Layer (1) having the layer constitution of Table 1-B |
| Support (1) having the layer constitution of Table 1-D |
| Backing layer (1) having the layer constitution of Table 1-C |

TABLE 1-B

| Constitution of Surface Layer (1) | | |
|---|---|---|
| Layer Number | Additives | Amount Coated (g/m2) |
| 4th Layer | Water-soluble Polymer (1) | 0.25 |
| | Water-soluble Polymer (2) | 0.07 |
| | Guanidine Picolinate | 0.45 |
| | Surfactant (1) | 0.01 |
| | Surfactant (2) | 0.10 |
| | Surfactant (3) | 0.03 |
| 3rd Layer | Gelatin | 0.25 |
| | Water-Soluble Polymer (1) | 0.02 |
| | Surfactant (1) | 0.005 |
| | Surfactant (2) | 0.005 |

TABLE 1-B-continued

| Constitution of Surface Layer (1) | | |
|---|---|---|
| Layer Number | Additives | Amount Coated (g/m2) |
| | Hardening Agent (1) | 0.06 |
| 2nd Layer | Gelatin | 1.40 |
| | Water-soluble Polymer (1) | 0.20 |
| | Water-soluble Polymer (3) | 0.60 |
| | Mordant (1) | 2.40 |
| | Guanidine Picolinate | 2.20 |
| | Fluorescent Brightening Agent (1) | 0.055 |
| | Stain Inhibitor (1) | 0.060 |
| | High Boiling Point Organic Solvent (1) | 1.40 |
| | Surfactant (4) | 0.025 |
| 1st Layer | Gelatin | 0.25 |
| | Water-soluble Polymer (1) | 0.02 |
| | Surfactant (1) | 0.005 |
| | Surfactant (2) | 0.005 |
| | Hardening Agent (1) | 0.16 |

TABLE 1-C

| Constitution of Backing Layer (1) | | |
|---|---|---|
| Layer Number | Additives | Amount Coated (g/m2) |
| 1st Backing | Gelatin | 3.00 |

TABLE 1-C-continued

| Layer Number | Constitution of Backing Layer (1) Additives | Amount Coated (g/m²) |
|---|---|---|
| Layer | Water-soluble Polymer (4) | 0.04 |
| | Surfactant (1) | 0.05 |
| | Hardening Agent (1) | 0.13 |
| 2nd Backing | Gelatin | 0.37 |
| Layer | Water-soluble Polymer (4) | 0.005 |
| | Surfactant (1) | 0.045 |
| | Surfactant (5) | 0.011 |
| | Mat Agent (1) | 0.03 |

TABLE 1-D

| Layer | Constitution of Support (1) Composition | Thickness (μm) |
|---|---|---|
| Surface Subbing Layer | Gelatin | 0.1 |
| Surface PE Layer (Glossy) | Low Density Polyethylene (density 0.923); 89.2 parts Surface-treated Titanium Oxide; 10.0 parts Ultramarine; 0.8 parts | 36.0 |
| Pulp Layer | Wood-free Paper (LBKP/NBKP = 1/1, density 1.080) | 73.0 |
| Back PE Layer (mat) | High Density Polyethylene- (density 0.960) | 30.0 |
| Back Subbing | Gelatin | 0.05 |
| Layer | Colloidal Silica | 0.05 |
| | Total | 139.2 |

TABLE 1-E

| Item | Unit | Physical Properties of Support (1) Physical Value | Method of Measurement |
|---|---|---|---|
| Toughness (length/width) | g | 4.40/3.15 | Taper Toughness Meter |
| Whiteness | | L* 94.20 | CLE L*a*b* |
| | | a* +0.12 | |
| | | b* −2.75 | |

Compounds used in preparing Sample 100 are mentioned below.

Water-soluble Polymer (1):

Sumikagel L5-H (product by Sumitomo Chemical Co., Ltd.)

Water-soluble Polymer (2):

κ-Carrageenan (product by Taito Co.)

Water-soluble Polymer (3):

Dextran (molecular weight: 70,000)

Fluorescent Brightening Agent (1):

2,5-Bis(5-t-benzoxazol (2)) thiophene

High Boiling Point Organic Solvent (1):

Enpara 40 (product by Ajinomoto Co., Inc.)

Mat Agent (1):

Benzoguanamine Resin (mean grain size 15 μm).

Water-soluble Polymer (4)

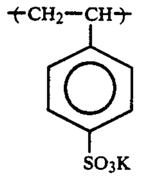

Surfactant (1)

-continued

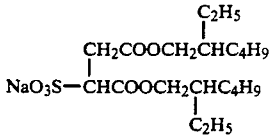

Surfactant (2)

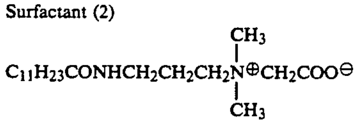

Surfactant (3)

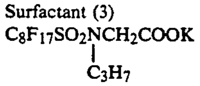

Surfactant (4)

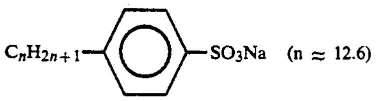

Surfactant (5)

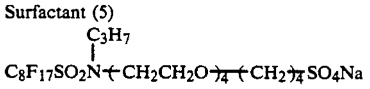

Hardening Agent (1)

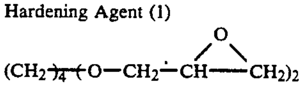

Mordant (1)

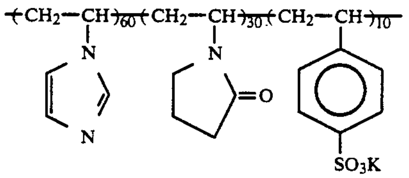

Stain Inhibitor (1)

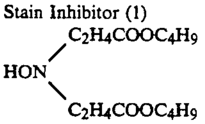

In addition, Dye-Fixing Element Samples 101 to 114 were prepared in the same manner as above, except that a gas-permeable hydrophobic layer was provided on the backing layer of Sample 100 as indicated below.

Dye-Fixing Element Sample 101

A coating composition mentioned below was coated in a wet thickness of 20 μm and dried first at 25° C. and 40% RH for 2 minutes and then at 80° C. for 5 minutes, to prepare Sample 101.

| Coating Composition: | |
|---|---|
| Cellulose Acetate (acetylation degree 60%) | 25.9 g |
| Cellulose Acetate (acetylation degree 57%) | 17.3 g |
| Methylene Chloride | 65.3 g |
| Methanol | 12.5 g |
| Water | 2.8 cc |
| Ethylene Glycol | 0.6 g |
| Colloidal Silica (grain size 40 nm) | 0.8 g |
| Crosslinking Agent (2) (Polyisocyanate KP-90: product by Dainippon Ink and | 0.6 g |

-continued

| Coating Composition: |
|---|
| Chemicals, Inc.) |

Dye-Fixing Element Sample 102

Sample 102 was prepared in the same manner as in preparation of Sample 101, except that crosslinking agent (2) was replaced by crosslinking agent (1) (the same as the hardening agent (1)) in the gas-permeable hydrophobic layer.

Dye-Fixing Element Sample 103

A coating composition mentioned below was coated in a wet thickness of 15 μm and then dried.

| | |
|---|---|
| Fine Polystyrene Grains (mean grain size 1 μm) | 10 g |
| Acrylate Latex (1) (solids content 45%; Nipol (trade name) LX 823 (Tg: −45° C.); product by Nippon Zeon Co., Ltd.) | 5 g |
| Water | 35 cc |

Dye-Fixing Element Sample 104

Sample 104 was prepared in the same manner as in preparation of Sample 103, except that an aqueous urethane resin (HYDRAN (trade name) AP-30 (solids content 20%); product by Dainippon Ink and Chemicals, Inc.) was used in place of acrylate latex (1) in the same weight as the solids content.

Dye-Fixing Element Samples 105 and 106

Samples 105 and 106 were prepared in the same manner as in preparation of Sample 103, except that silica grains (mean grain size 3 μm) and benzoguanamine resin grains (mean grain size 3 μm; Eposter M-30, product by Nippon Shokubai Kagaku Kogyo Co., Ltd.) were used, respectively, in place of fine polystyrene grains.

Dye-Fixing Element Samples 107 and 108

Samples 107 and 108 were prepared by coating Nipol (trade name) LX-826 and HYDRAN (trade name) AP-30, respectively, each in the form of a diluted aqueous solution (solids content 10%), in a wet thickness of 15 μm, followed by drying the coat.

Dye-Fixing Element Samples 109 and 110

Samples 109 and 110 were prepared in the same manner as in preparation of Samples 107 and 108, respectively, except that mat agent (1) as incorporated into the backing layer was added to the gas-permeable hydrophobic layer.

Dye-Fixing Element Sample 111

Sample 111 was prepared in the same manner as in preparation of Sample 100, except that the backing layer was not coated.

Dye-Fixing Element Samples 112, 113 and 114

Samples 112, 113 and 114 were prepared in the same manner as in preparation of Samples 100, 108 and 111, respectively, except that the support was replaced by a 100 μm-thick polyethylene terephthalate.

All the Dye-Fixing Element Samples 100 to 114 thus prepared were tempered under the condition of 25° C. and 80% RH for one hour, and they were piled up in such a way that the front surface (with dye-fixing layer) of one sample was kept in contact with the back surface of another sample. A weight of 2 kg per one A-4 size (21 cm×29.7 cm) sheet was applied to the pile, which was thus stored for one day under an ambient condition of 60° C. and 80% RH.

Each of the thus stored dye-fixing element samples was combined with the previously prepared photographic element Sample A, and processed with an image recording processor as described in JP-A-2-84634.

Precisely, the photographic material sample was exposed with an original (completely gray chart for test of unevenness in photographic processing) through a slit by scanning exposure, the exposed sample was dipped in water kept at 40° C. for about 5 seconds, this was squeezed with rollers and then immediately attached to a dye-fixing element sample in such a way that the coated front surfaces of the two faced each other, and the combined samples were heated with heat rollers for 15 seconds in such a way that the water-applied surfaces were heated up to 80° C. Then, the photographic element sample was peeled from the dye-fixing element sample, whereupon a completely gray image was formed on the dye-fixing element sample.

The degree of the unevenness of the thus formed image was evaluated on the basis of the following three ranks A, B and C, and the results obtained are shown in Table 2 below.

A: Image was uniform and was not uneven.

B: Image was somewhat uneven.

C: Image was noticeably uneven.

In addition, each of the non-processed dye-fixing element samples was cut into a size of 10 cm×10 cm and tempered for one day under an ambient condition of 25° C. and 50% RH, whereupon the curled degree of each sample was measured. Additionally, they were put in a thermostat tempered to have an ambient condition of 25° C. and 20% RH, whereupon the curled degree was measured in one minute, 5 minutes and 30 minutes. Next, these samples were transferred to an ambient condition of 25° C. and 70% RH, whereupon the curled degree was measured in the same manner as above.

Measurement of the curled degree of samples was effected as follows: A sample to be measured was put on a flat desk with the dye-fixing layer thereof facing upwards, and the height of the four edges of the sample from the surface of the desk was measured. The curled degree indicates the average of the measured values. If the sample curled backwards, the degree was represented to have a minus (−) value. The results obtained are shown in Table 2 below.

TABLE 2

Results of Example 1

| Dye-Fixing Element Sample Number | Storage Stability of Piled Samples | Curl (mm) 50% RH → 20% RH 1 min. | 5 min. | 30 min. | 20% RH → 70% RH 1 min. | 5 min. | 30 min. |
|---|---|---|---|---|---|---|---|
| 100 (comparative | B to C | 4 | 6 | 6 | −2 | 0 | 0 |

TABLE 2-continued

Results of Example 1

| Dye-Fixing Element Sample Number | Storage Stability of Piled Samples | Curl (mm) 50% RH → 20% RH 1 min. | 5 min. | 30 min. | 20% RH → 70% RH 1 min. | 5 min. | 30 min. |
|---|---|---|---|---|---|---|---|
| sample) | | | | | | | |
| 101 (sample of the invention) | A | 3 | 3 | 3 | −3 | 0 | 0 |
| 102 (sample of the invention) | A | 3 | 3 | 3 | −3 | 0 | 0 |
| 103 (sample of the invention) | A | 5 | 6 | 6 | −4 | 0 | 0 |
| 104 (sample of the invention) | A | 4 | 5 | 5 | −3 | 0 | 0 |
| 105 (sample of the invention) | A to B | 4 | 6 | 6 | −2 | 0 | 0 |
| 106 (sample of the invention) | A | 4 | 6 | 6 | −3 | 0 | 0 |
| 107 (sample of the invention) | A | 10 | 6 | 6 | −13 | 0 | 0 |
| 108 (sample of the invention) | A | 15 | 5 | 6 | −10 | 0 | 0 |
| 109 (sample of the invention) | A | 12 | 5 | 5 | −12 | 0 | 0 |
| 110 (sample of the invention) | A | 14 | 6 | 5 | −9 | 0 | 0 |
| 111 (comparative sample) | A | 26 | 30 | >35 | 17 | 0 | 0 |
| 112 (comparative sample) | C | 7 | 19 | 9 | 0 | 0 | 0 |
| 113 (sample of the invention) | A | 18 | 8 | 7 | 0 | 0 | 0 |
| 114 (comparative sample) | A | 30 | >35 | 35 | 0 | 0 | 0 |

As is obvious from the results in Table 2 above, the dye-fixing element samples of the present invention were well stored in the form of a pile under a high humidity condition, without migration of the base precursor from the dye-fixing layer to the backing layer of the adjacent sheet. As a result, the samples of the present invention were free from unevenness in development and transfer, and they were therefore free from unevenness of the transferred dye. In addition, when the samples of the present invention were moved from the middle or high humidity condition to the low humidity condition, or were moved from the low humidity condition to the high humidity condition, they curled less than the comparative samples.

EXAMPLE 2

Dye-fixing element Samples 201 to 205 were prepared in the same manner as in preparation of Sample 101 of Example 1, except that the points as indicated in Table 3 below were changed.

These samples were subjected to the same pile storage stability test and curling test under a high humidity condition as those effected in Example 1. As a result, all the samples showed the same quality as Sample 101 of Example 1.

In addition, the film strength and the adhesion strength of the hydrophobic porous layer of each of the samples prepared here were tested by the method mentioned below. Precisely, the surface of the transferred and processed sample was cut with a cutter knife, both in the lengthwise direction and the widthwise direction at regular intervals of 2 cm, an adhesive tape was stuck thereto, and it was peeled off from the sample as rapidly as possible; whereupon, the degree of the broken surface of the sample was evaluated on the basis of the following three ranks A, B and C. The results obtained are shown in Table 3 below.

A: The surface was neither peeled nor broken.

B: One half of the surface was peeled and broken.

C: Almost all the surface was peeled and broken.

TABLE 3

| Dye-Fixing Element Sample No. | Modification from Sample No. 101 | Pile Storage Stability | Film Strength |
|---|---|---|---|
| 101 (sample of the Invention) | — | A | A |
| 102 (sample of the Invention) | Crosslinking agent (1) was used in place of Crosslinking agent (2). | A | A |
| 201 (sample of the Invention) | Crosslinking agent (2) and colloidal silica were removed. | A | B |
| 202 (sample of the Invention) | Ethylene glycol and colloidal silica were removed. | A | B |
| 203 (sample of the Invention) | Colloidal silica was removed. | A | A to B |
| 204 (sample of the Invention) | Crosslinking agent (2), ethylene glycol and colloidal silica were removed. | A | C |
| 205 (sample of the Invention) | Silica grains having mean grain size of 1 μm were used in place of colloidal silica. | A | B |

As is obvious from the results in Table 3 above, the film strength of the gas-permeable hydrophobic layer, containing a porous layer made of cellulose acetate in each of the dye-fixing element samples of the present invention, was enhanced by addition of a crosslinking agent (polyisocyanate or epoxy compound), a plasticizer such as ethylene glycol or the like polyalcohol, and an inorganic filler such as colloidal silica, thereto.

As mentioned in detail above, since the dye-fixing element of the present invention has a gas-permeable hydrophobic layer as the outermost layer of the backing layer containing a hydrophilic binder, it may stably be stored in the form of a pile of plural elements even under a high humidity condition. Where a pile of the elements of the present invention is stored under a high humidity condition, the base or base precursor, especially a water-soluble base or precursor thereof as contained in the dye-fixing layer or in the adjacent layers, does not migrate to the adjacent backing layer. As a result, the thus stored elements are absolutely free from unevenness of transferred images. Thus, the storage stability of the dye-fixing elements of the present invention has noticeably been improved. Owing to the present invention, therefore, housing magazines and packages for housing dye-fixing elements may be simplified.

In addition, since the gas-permeable hydrophobic layer (as coated over the backing layer of the element of the present invention) may conduct smooth absorption and desorption of water to and from the backing layer containing a hydrophilic binder, the curling balance of the element is not lost despite fluctuation of the ambient humidity condition.

Moreover, the film strength of the gas-permeable hydrophobic layer of a porous layer made of cellulose acetate, to be coated over the backing layer of the element of the present invention, may be noticeably enhanced by addition of a polyisocyanate or epoxy crosslinking agent, a polyhydric alcohol plasticizer and/or an inorganic filler thereto.

While the invention has been described in detail and with reference to specific embodiments thereof, it will be apparent to one skilled in the art that various changes and modifications can be made therein without departing from the spirit and scope thereof.

What is claimed is:

1. A photographic element comprising a water-soluble base or base precursor in at least a dye-fixing layer or an adjacent layer(s) thereto on one surface of a support and a backing layer comprising a hydrophilic binder on the other surface of the support, wherein a gas-permeable hydrophobic layer is provided as the outermost layer of said backing layer, and said gas-permeable hydrophobic layer is an aeriferous porous layer containing a hydrophobic polymer.

2. A dye-fixing element to which is transferred a mobile dye to be formed or released by heat-development of a photographic element; wherein said photographic element comprises a light-sensitive silver halide, a hydrophilic binder and a dye providing compound for forming or releasing a mobile dye in correspondence or reverse correspondence with the amount of exposure, after or simultaneously with, imagewise exposure of said photographic element in the presence of at least one of a base and a base precursor; and wherein said dye-fixing element comprises a water-soluble base or base precursor in at least a dye-fixing layer or an adjacent layer(s) on one surface of a support, and has a backing layer comprising a hydrophilic binder on the other surface of said support and comprising, as the outermost layer, a gas-permeable hydrophobic layer, and said gas-permeable hydrophobic layer is an aeriferous layer containing a hydrophobic polymer.

3. A photographic element as in claim 1, in which the hydrophobic polymer is cellulose acetate.

4. A photographic element as in claim 1, in which the aeriferous porous layer contains cellulose acetate along with at least one of an organic or inorganic filler, a polyhydric alcohol, and a crosslinking agent.

5. A dye-fixing element as in claim 2, in which the hydrophobic polymer is cellulose acetate.

6. A dye-fixing element as in claim 2, in which the porous layer contains cellulose acetate along with at least one of an organic or inorganic filler, a polyalcohol, and a crosslinking agent.

7. A photographic element comprising a water-soluble base or base precursor in at least a dye-fixing layer or an adjacent layer(s) thereto on one surface of a support and a backing layer comprising a hydrophilic binder on the other surface of the support, wherein a gas-permeable hydrophobic layer is provided as the outermost layer of said backing layer, and said gas-permeable hydrophobic layer is an aeriferous hydrophobic layer comprising organic or inorganic fine grains and a hydrophobic polymer as an adhesive for said fine grains.

8. A dye-fixing element to which is transferred a mobile dye to be formed or released by heat-development of a photographic element; wherein said photographic element comprises a light-sensitive silver halide, a hydrophilic binder and a dye providing compound for forming or releasing a mobile dye in correspondence or reverse correspondence with the amount of exposure, after or simultaneously with, imagewise exposure of said photographic element in the presence of at least one of a base and a base precursor; and wherein said dye-fixing element comprises a water-soluble base or base precursor in at least a dye-fixing layer or an adjacent layer(s) on one surface of a support, and has a backing layer comprising a hydrophilic binder on the other surface of said support and comprising, as the outermost layer, a gas-permeable hydrophobic layer, wherein said gas-permeable hydrophobic layer is an aeriferous hydrophobic layer comprising organic or inorganic fine grains and a hydrophobic polymer as an adhesive for said fine grains.

* * * * *